US010046465B2

(12) United States Patent
Goto et al.

(10) Patent No.: US 10,046,465 B2
(45) Date of Patent: Aug. 14, 2018

(54) ATTACHING AND DETACHING DEVICE AND ROBOT

(71) Applicant: Seiko Epson Corporation, Tokyo (JP)

(72) Inventors: Yoshinobu Goto, Azumino (JP); Toshio Tanaka, Azumino (JP)

(73) Assignee: Seiko Epson Corporation (JP)

( * ) Notice: Subject to any disclaimer, the term of this patent is extended or adjusted under 35 U.S.C. 154(b) by 168 days.

(21) Appl. No.: 14/202,652

(22) Filed: Mar. 10, 2014

(65) Prior Publication Data

US 2014/0363223 A1    Dec. 11, 2014

(30) Foreign Application Priority Data

Jun. 6, 2013  (JP) ................................. 2013-119569
Jun. 7, 2013  (JP) ................................. 2013-120504

(51) Int. Cl.
  *B25G 3/18*    (2006.01)
  *B25J 15/04*   (2006.01)

(52) U.S. Cl.
  CPC ........ *B25J 15/0408* (2013.01); *Y10S 483/901* (2013.01); *Y10T 403/60* (2015.01)

(58) Field of Classification Search
  CPC .... B25J 15/04; B25J 15/0408; B25J 15/0491; B25J 19/0029; B25J 15/0416; B25J 15/0425; B25J 15/0433; B25J 15/045; B25J 15/0458; Y10T 403/595; Y10T 403/60; H01R 13/62933; Y10S 483/901; Y10S 483/902
  See application file for complete search history.

(56) References Cited

U.S. PATENT DOCUMENTS

| 2,489,864 A | * | 11/1949 | Cravener | ................. B66C 1/10 |
| | | | | 294/119.1 |
| 2,869,952 A | * | 1/1959 | Saunders | ................ E05C 19/02 |
| | | | | 109/63.5 |
| 4,103,511 A | * | 8/1978 | Kress | ........................ B25F 3/00 |
| | | | | 29/560 |
| 4,281,447 A | * | 8/1981 | Miller | ..................... B23Q 3/06 |
| | | | | 279/126 |

(Continued)

FOREIGN PATENT DOCUMENTS

| JP | 51-047074 U | 4/1976 |
| JP | 51-074978 U | 6/1976 |

(Continued)

*Primary Examiner* — Michael P Ferguson
*Assistant Examiner* — Matthew R McMahon
(74) *Attorney, Agent, or Firm* — Harness, Dickey & Pierce, P.L.C.

(57) ABSTRACT

An attaching and detaching device that detachably attaches two structures includes a base fixed to one structure of the two structures and formed in a tabular shape, one or more engaging members supported by the base movably along a surface direction of the base and configured to engage with the other structure, an urging member configured to urge the engaging member toward an engaging direction in which the engaging member engages with the other structure, and a releasing mechanism including an operation lever configured to perform operation for moving the engaging member in a direction opposite to the engaging direction and releasing an attached state in which the two structures are attached to each other.

16 Claims, 18 Drawing Sheets

(56) References Cited

U.S. PATENT DOCUMENTS

| | | | | |
|---|---|---|---|---|
| 4,384,397 A | * | 5/1983 | Nelson | B23Q 3/15773 |
| | | | | 414/736 |
| 4,474,492 A | * | 10/1984 | Fleitas | B62D 43/04 |
| | | | | 292/202 |
| 4,501,460 A | * | 2/1985 | Sisler | G06F 1/181 |
| | | | | 361/679.58 |
| 4,512,709 A | * | 4/1985 | Hennekes | B23Q 1/0063 |
| | | | | 294/86.4 |
| 4,611,377 A | * | 9/1986 | McCormick | B23Q 3/15553 |
| | | | | 29/407.05 |
| 4,632,594 A | * | 12/1986 | Del Tufo | H01R 13/62 |
| | | | | 206/821 |
| 4,664,588 A | * | 5/1987 | Newell | B23Q 1/0063 |
| | | | | 294/86.4 |
| 4,913,617 A | * | 4/1990 | Nicholson | B25J 9/0084 |
| | | | | 294/86.4 |
| 5,044,063 A | * | 9/1991 | Voellmer | B23Q 3/15553 |
| | | | | 294/86.4 |
| 5,062,668 A | * | 11/1991 | Onderka | F16P 3/10 |
| | | | | 200/61.64 |
| 5,083,352 A | * | 1/1992 | Nakako | B23Q 5/58 |
| | | | | 29/57 |
| 5,096,236 A | * | 3/1992 | Thony | F16B 21/06 |
| | | | | 24/674 |
| 5,201,695 A | * | 4/1993 | Ruetschle | B23Q 3/15706 |
| | | | | 483/3 |
| 5,232,303 A | * | 8/1993 | Rubner | A47B 13/021 |
| | | | | 248/188 |
| 5,507,566 A | * | 4/1996 | Chen | B60B 37/10 |
| | | | | 301/111.06 |
| 5,513,079 A | * | 4/1996 | Millard | G01R 1/04 |
| | | | | 174/17 R |
| 5,584,595 A | * | 12/1996 | Gantitano | A47B 81/06 |
| | | | | 312/111 |
| 5,738,537 A | * | 4/1998 | Setoguchi | G06F 1/1632 |
| | | | | 439/159 |
| 6,315,586 B1 | * | 11/2001 | Joyce | G06F 1/184 |
| | | | | 439/157 |
| 6,491,612 B1 | * | 12/2002 | Kurup | B23K 9/20 |
| | | | | 285/268 |
| 6,569,070 B1 | * | 5/2003 | Harrington | B23Q 1/0072 |
| | | | | 294/86.4 |
| 6,855,558 B1 | * | 2/2005 | Hattori | H01R 13/62933 |
| | | | | 385/53 |
| 6,966,582 B1 | * | 11/2005 | Malone | F24C 15/022 |
| | | | | 292/109 |
| 7,027,309 B2 | * | 4/2006 | Franz | H01R 13/62933 |
| | | | | 361/732 |
| 7,159,910 B2 | * | 1/2007 | Hwang | D06F 39/14 |
| | | | | 292/302 |
| 7,282,017 B2 | * | 10/2007 | Jordil | B23Q 1/0072 |
| | | | | 279/71 |
| 7,300,300 B2 | * | 11/2007 | Meijer | H01R 13/6275 |
| | | | | 439/372 |
| 7,322,127 B2 | * | 1/2008 | Hwang | D06F 58/04 |
| | | | | 34/595 |
| 7,700,902 B2 | * | 4/2010 | Mock | F42B 10/14 |
| | | | | 188/181 T |
| 7,794,171 B2 | * | 9/2010 | Park | B25J 3/04 |
| | | | | 403/349 |
| 8,038,484 B2 | * | 10/2011 | Selvitelli | A61B 5/0416 |
| | | | | 439/729 |
| 8,360,492 B2 | * | 1/2013 | Winzinger | B65G 17/323 |
| | | | | 294/106 |
| 8,382,177 B2 | * | 2/2013 | Rizk | B25J 15/0475 |
| | | | | 269/228 |
| 8,601,667 B2 | * | 12/2013 | Norton | B23B 31/1071 |
| | | | | 279/140 |
| 8,857,821 B2 | * | 10/2014 | Norton | B23B 31/103 |
| | | | | 279/141 |
| 9,343,848 B2 | * | 5/2016 | Kodama | H01R 13/62938 |
| 9,456,909 B2 | * | 10/2016 | Johnson | A61F 2/76 |
| 2008/0119339 A1 | | 5/2008 | Oliver | |
| 2009/0322041 A1 | | 12/2009 | Norton | |
| 2010/0062919 A1 | | 3/2010 | Norton et al. | |
| 2011/0116862 A1 | * | 5/2011 | Lo | E05B 73/0082 |
| | | | | 403/326 |
| 2013/0059467 A1 | * | 3/2013 | Johnson | A61F 2/76 |
| | | | | 439/577 |
| 2015/0236447 A1 | * | 8/2015 | Nakajima | H01R 13/62933 |
| | | | | 403/322.4 |

FOREIGN PATENT DOCUMENTS

| | | |
|---|---|---|
| JP | 56-157986 A | 12/1981 |
| JP | 03-043174 | 2/1991 |
| JP | 05-154785 | 6/1993 |
| JP | 05-056308 U | 7/1993 |
| JP | 06-039766 | 2/1994 |
| JP | 07-041579 | 9/1995 |
| JP | 07-290389 | 11/1995 |
| JP | 08-257963 | 10/1996 |
| JP | 2001-087971 A | 4/2001 |
| JP | 2001-293677 A | 10/2001 |
| JP | 2011-189415 A | 9/2011 |

* cited by examiner

ATTACHING AND DETACHING DEVICE AND ROBOT

BACKGROUND

1. Technical Field

The present invention relates to an attaching and detaching device and a robot.

2. Related Art

There has been known a robot arm including a base and a plurality of arms supported displaceably with respect to the base and coupled to one another. An end effector (a robot hand) is detachably attached to a distal end of the robot arm. The robot arm is used in an attached state of the end effector (see, for example, JP-A-7-290389 (Patent Literature 1)).

When the end effector described in Patent Literature 1 is detached from the robot arm and replaced with another end effector, work for detaching the end effector is performed using an exclusive detaching tool (a stock pin) provided separately from the end effector. Therefore, since the robot system includes the detaching tool, the structure (the configuration) of the robot system is complicated. If the detaching tool is lost, the detaching work is difficult or impossible. Further, costs for building the robot system increase.

For example, during a robot arm operation, if an inadvertent force acts in a direction same as a direction in which the end effector described in Patent Literature 1 is detached from the robot arm, although the end effector has to be in the attached state, the end effector is easily detached from the robot arm.

SUMMARY

An advantage of some aspects of the invention is to provide an attaching and detaching device and a robot that can easily perform attachment and detachment of two structures with simple operation.

An aspect of the invention can be implemented as the following forms or application examples.

Application Example 1

This application example is directed to an attaching and detaching device that detachably attaches two structures, the attaching and detaching device including: a base fixed to one structure of the two structures and formed in a tabular shape; one or more engaging members supported by the base movably along a surface direction of the base and configured to engage with the other structure; an urging member configured to urge the engaging member toward an engaging direction in which the engaging member engages with the other structure; and a releasing mechanism including an operation lever configured to perform operation for moving the engaging member in a direction opposite to the engaging direction and releasing an attached state in which the two structures are attached to each other.

According to this application example, it is possible to easily perform attachment and detachment of the two structures with simple operation.

Application Example 2

This application example is directed to the attaching and detaching device according to the application example described above, wherein the engaging member includes an engaging surface that inclines with respect to the surface direction of the base and engages with a projecting section provided in the other structure.

According to this application example, the attached state is surely maintained. Therefore, the other structure is surely prevented from being detached from the one structure.

Application Example 3

This application example is directed to the attaching and detaching device according to the application example described above, wherein the base includes an insert-through hole through which the projecting section is inserted.

According to this application example, the engaging member and the projecting section can engage with each other.

Application Example 4

This application example is directed to the attaching and detaching device according to the application example described above, wherein the base includes a guide groove for guiding the engaging member inserted into the guide groove.

According to this application example, the engaging member can stably engage with the projecting section. Therefore, an engaging state of the engaging member and the projecting section is easily maintained.

Application Example 5

This application example is directed to the attaching and detaching device according to the application example described above, wherein the urging member is a compression coil spring inserted into the guide groove together with the engaging member.

According to this application example, it is possible to use a compression coil spring having a relatively small outer diameter as the compression coil spring.

Application Example 6

This application example is directed to the attaching and detaching device according to the application example described above, wherein at least a pair of the engaging members is arranged on the base.

According to this application example, it is stably maintain the attached state.

Application Example 7

This application example is directed to the attaching and detaching device according to the application example described above, wherein the releasing mechanism includes a link mechanism coupled with all the engaging members to collectively move the engaging members.

According to this application example, it is possible to quickly perform operation for releasing the attached state.

Application Example 8

This application example is directed to the attaching and detaching device according to the application example described above, wherein a toggle mechanism is configured by the operation lever and the link mechanism.

According to this application example, it is possible to operate the operation lever with as small a force as possible and easily and surely move the engaging member.

Application Example 9

This application example is directed to the attaching and detaching device according to the application example described above, wherein the operation lever is arranged on one surface of the base, and the link mechanism is arranged on the other surface of the base.

According to this application example, for example, it is easy to perform maintenance of the releasing mechanism.

Application Example 10

This application example is directed to the attaching and detaching device according to the application example described above, wherein the attaching and detaching device further includes a lock mechanism including a lever for lock that can take a prohibiting state for prohibiting the operation lever to perform the releasing operation and a permitting state for permitting the operation lever to perform the releasing operation.

According to this application example, it is possible to prevent the one structure of the two structures from being inadvertently and easily detached from the other structure in the attached state.

Application Example 11

This application example is directed to the attaching and detaching device according to the application example described above, wherein the lock mechanism includes a detecting section configured to detect that the lever for lock is in the prohibiting state.

According to this application example, it is possible to confirm electrically as well as visually that the lever for lock is in the prohibiting state. Therefore, safety is high.

Application Example 12

This application example is directed to the attaching and detaching device according to the application example described above, wherein the detecting unit includes a proximity sensor set on the base and opposed to the lever for lock in the prohibiting state.

According to this application example, it is possible to surely detect with a simple configuration that the lever for lock is in the prohibiting state.

Application Example 13

This application example is directed to the attaching and detaching device according to the application example described above, wherein the lock mechanism includes a fixing section capable of fixing the lever for lock in the prohibiting state.

According to this application example, it is possible to prevent the lever for lock in the prohibiting state from inadvertently changing to the permitting state. Therefore, safety is high.

Application Example 14

This application example is directed to the attaching and detaching device according to the application example described above, wherein a cam groove is provided in one lever of the lever for lock and the operation lever, and a cam follower inserted into the cam groove is projectingly provided in the other lever.

According to this application example, it is possible to smoothly perform operation of the lever for lock.

Application Example 15

This application example is directed to the attaching and detaching device according to the application example described above, wherein, in at least the permitting state, the cam follower engages with the cam groove and the lever for lock and the operation lever are coupled.

According to this application example, it is possible to prevent the lever for lock from being detached and, for example, lost.

Application Example 16

This application example is directed to the attaching and detaching device according to the application example described above, wherein the engaging member includes an engaging surface that inclines with respect to the surface direction of the base and engages with the projecting section provided in the other structure.

According to this application example, the attached state is surely maintained. Therefore, the other structure is surely prevented from being detached from the one structure.

Application Example 17

This application example is directed to the attaching and detaching device according to the application example described above, wherein the operation lever can move the engaging member resisting an urging force of the urging member.

According to this application example, it is possible to maintain the attached state.

Application Example 18

This application example is directed to a robot including: the attaching and detaching device according to the application example explained above; and two structures detachably attached via the attaching and detaching device. One structure of the two structures is a robot arm. The other structure is an end effector.

According to this application example, it is possible to easily perform attachment and detachment of the two structures with simple operation.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An attaching and detaching device and a robot according to this embodiment are explained in detail below on the basis of preferred embodiments shown in the accompanying drawings.

Figure 1:
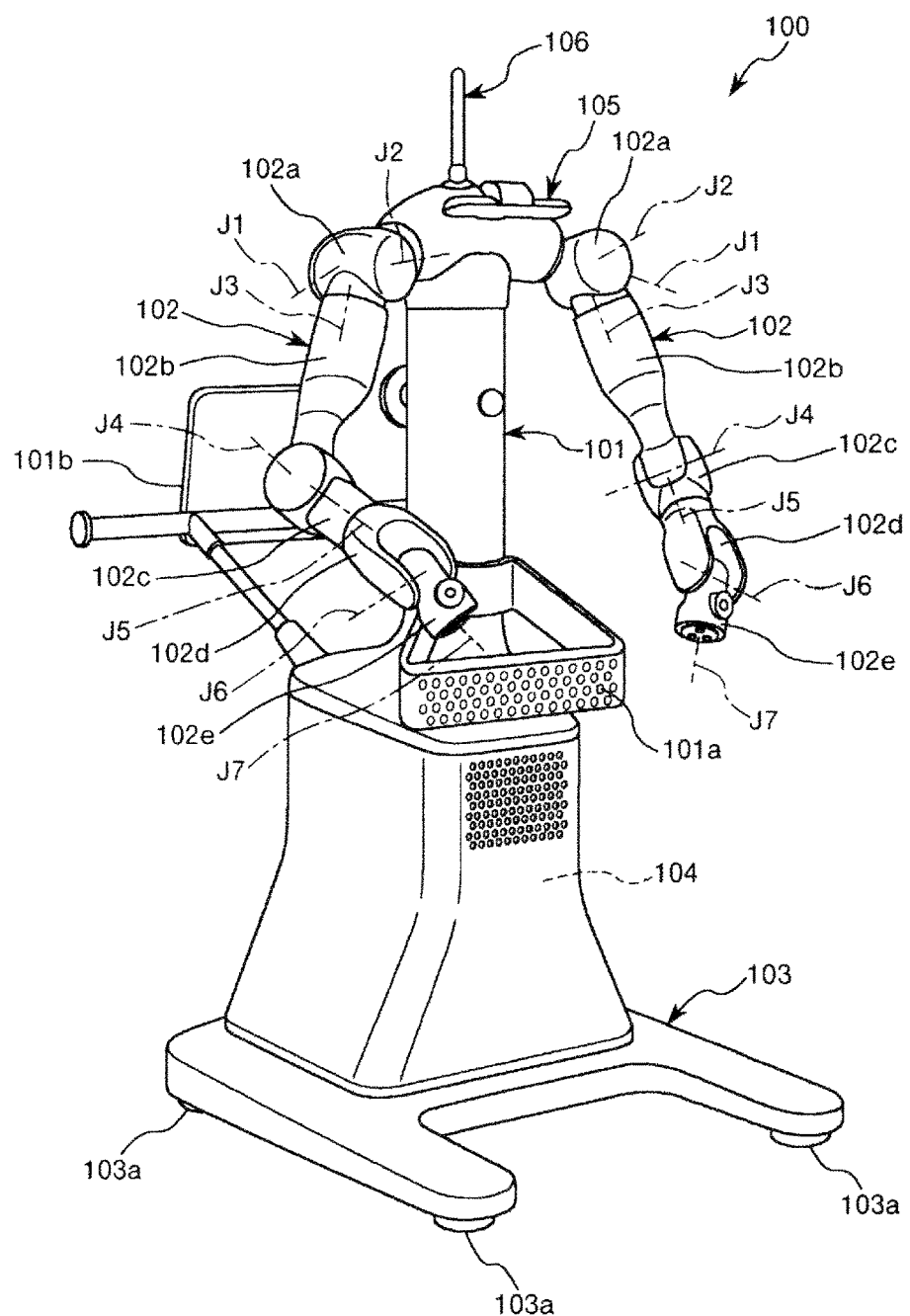
FIG. 1 is a perspective view showing a robot according to a first embodiment applied to a humanoid double-arm robot.
Figure 2:
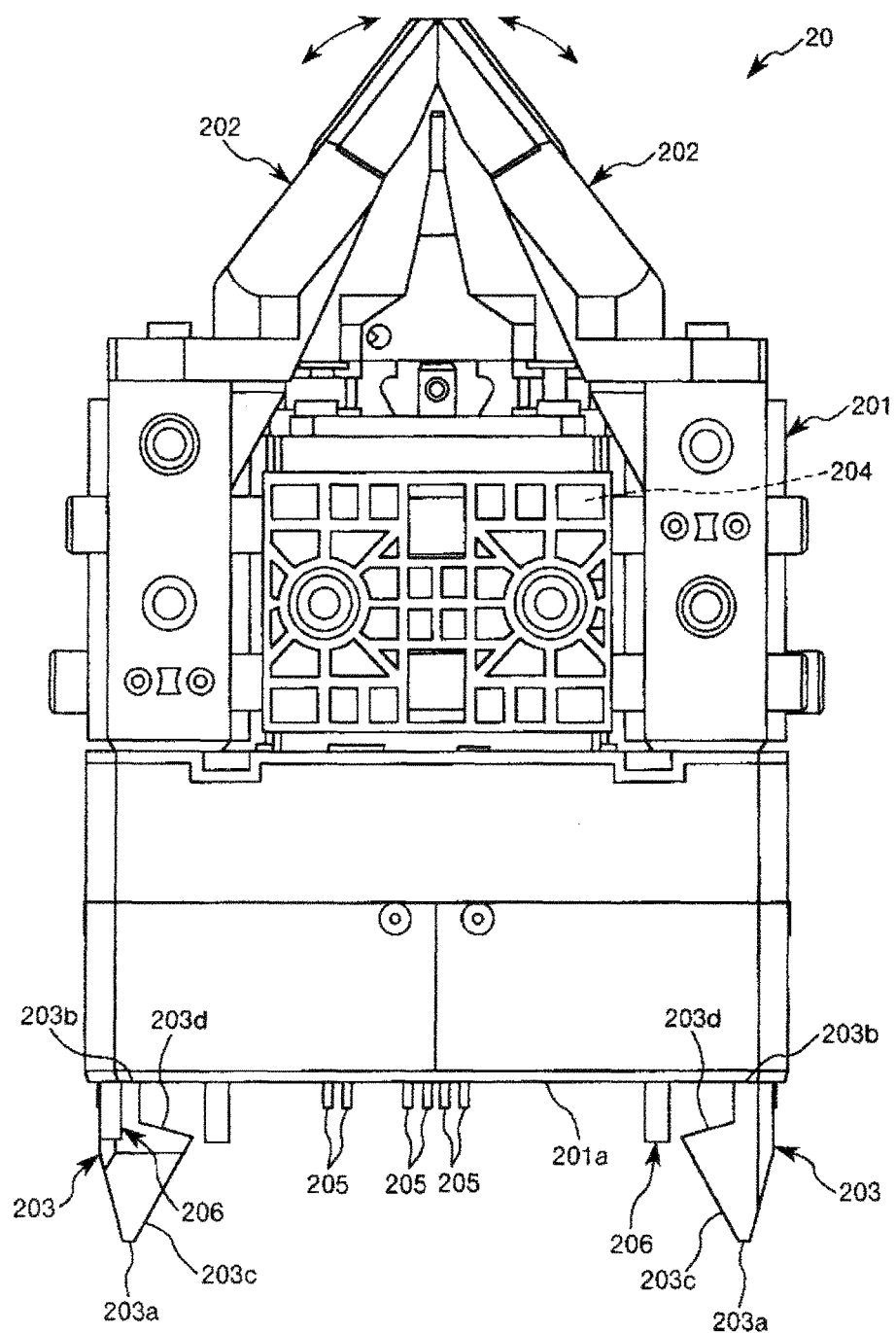
FIG. 2 is a side view of an end effector attached to an arm of the robot shown in FIG. 1.
Figure 3:
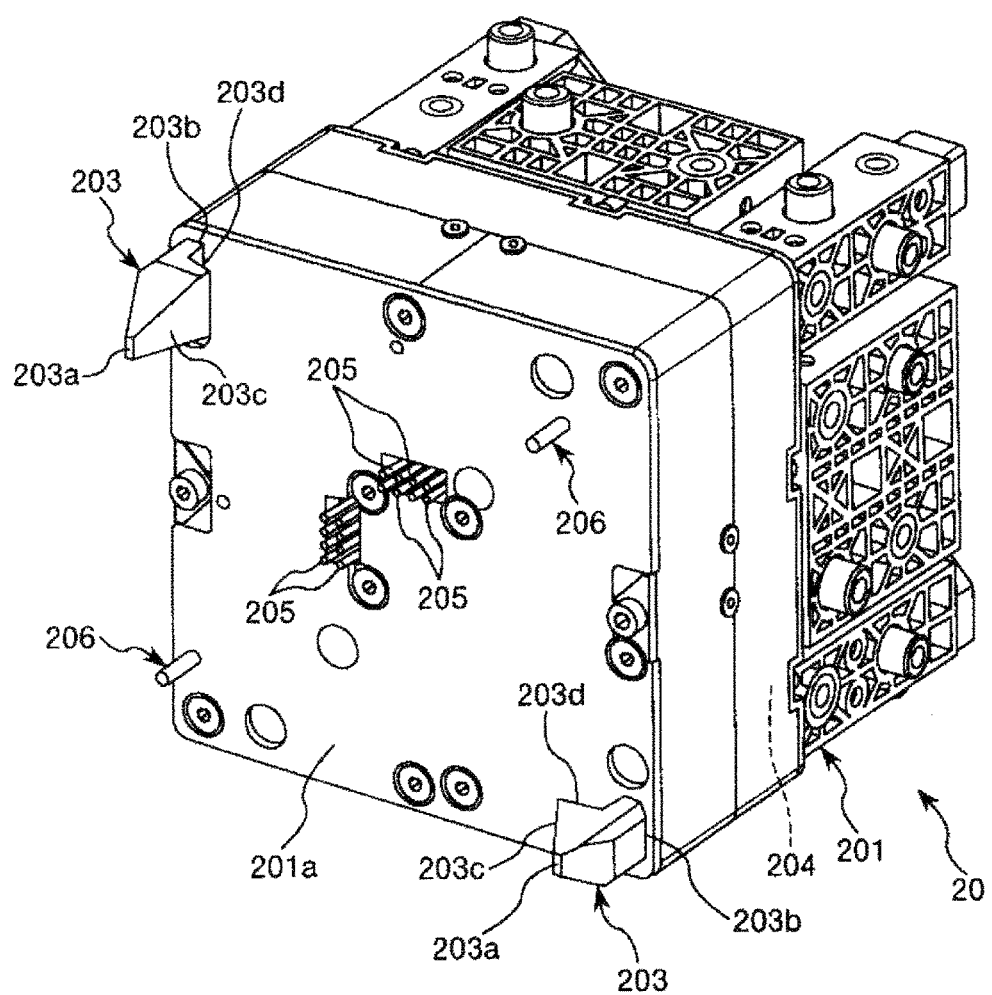
FIG. 3 is a perspective view of the end effector shown in FIG. 2.
Figure 4:
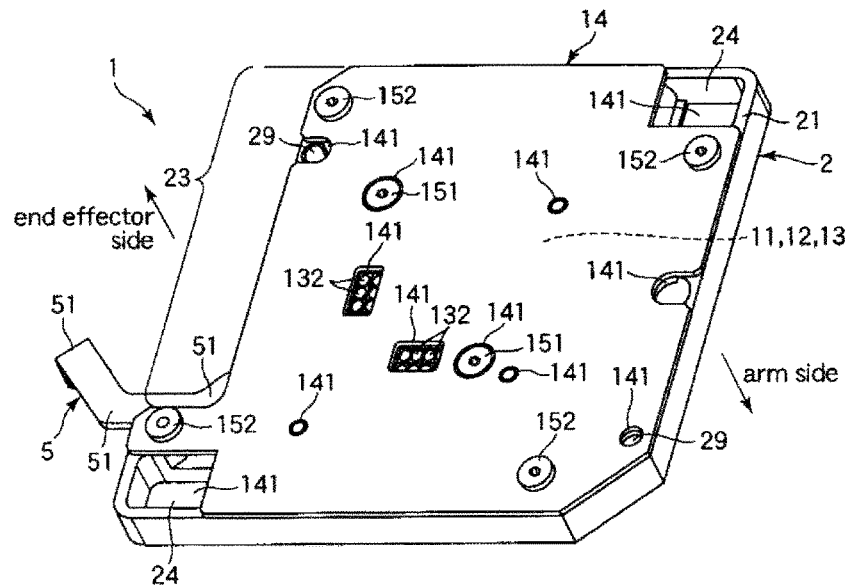
FIG. 4 is a perspective view showing an attaching and detaching device according to the first embodiment.
Figure 5:
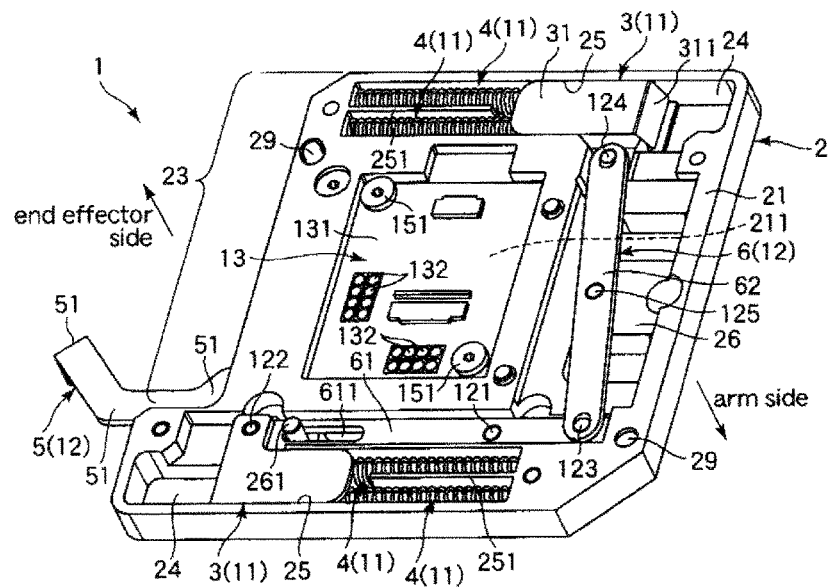
FIG. 5 is a perspective view showing a detached state of an internal structure on the front side of the attaching and detaching device shown in FIG. 4.
Figure 6:
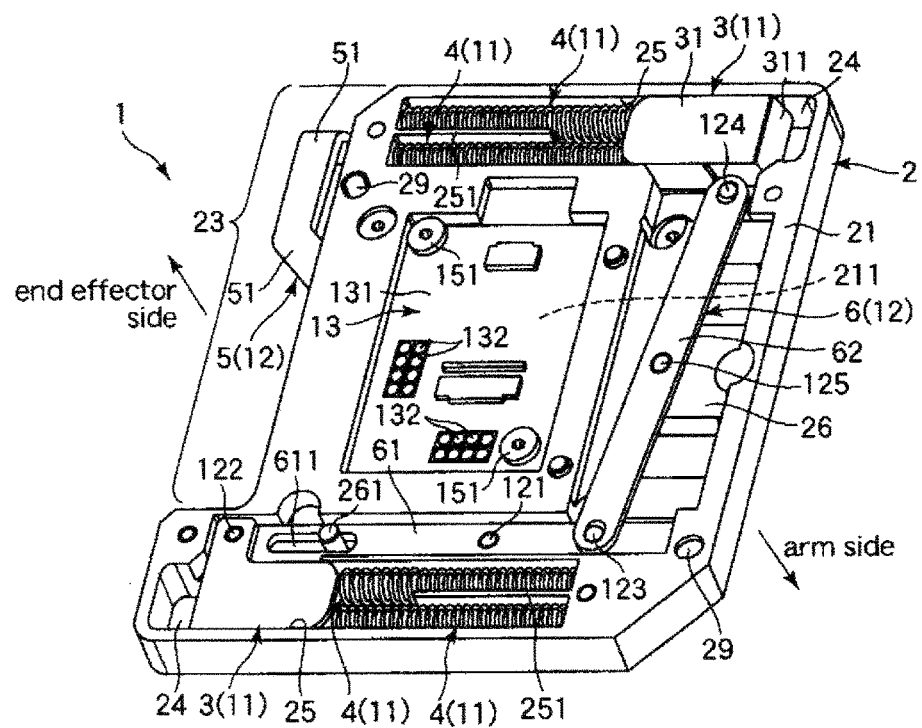
FIG. 6 is a perspective view showing an attached state of the internal structure on the front side of the attaching and detaching device shown in FIG. 4.
Figure 7:
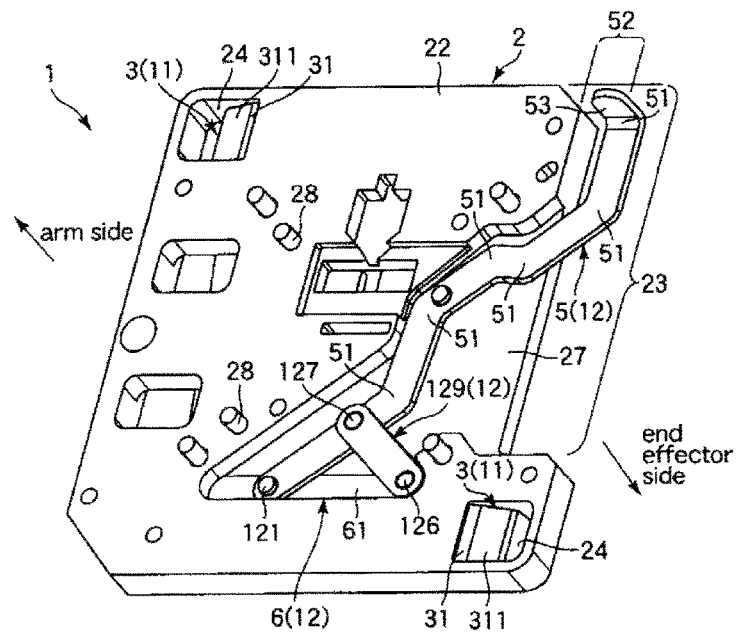
FIG. 7 is a perspective view showing an attached state of an internal structure on the rear side of the attaching and detaching device shown in FIG. 4.
Figure 8:
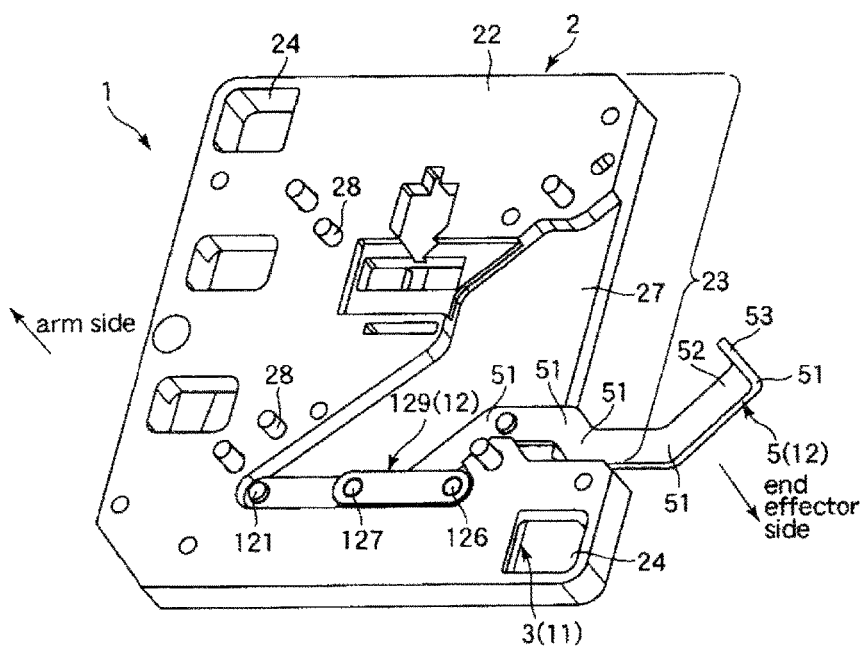
FIG. 8 is a perspective view showing a detached state of the internal structure on the rear side of the attaching and detaching device shown in FIG. 4.
Figure 9:
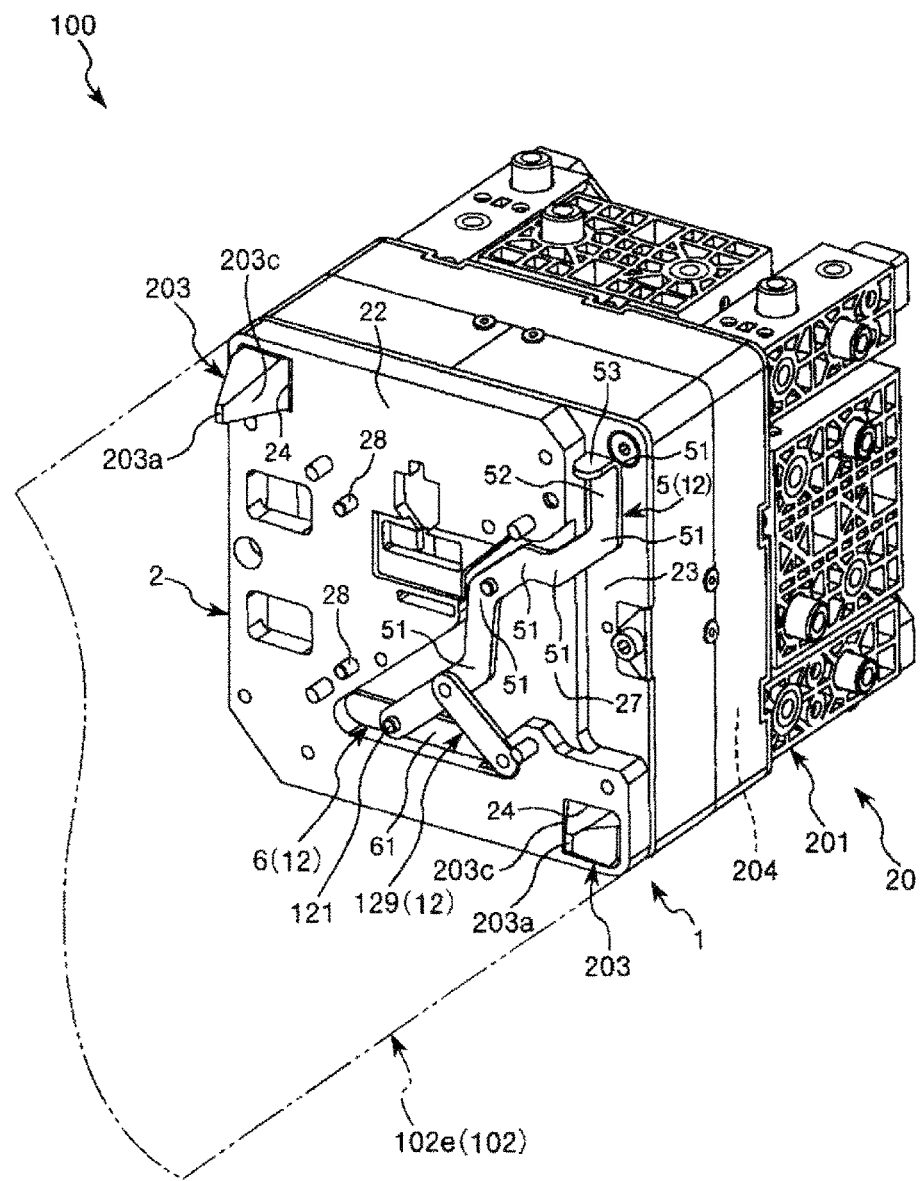
FIG. 9 is a perspective view showing a state in which the end effector is attached to the attaching and detaching device according to the first embodiment.
Figure 10:
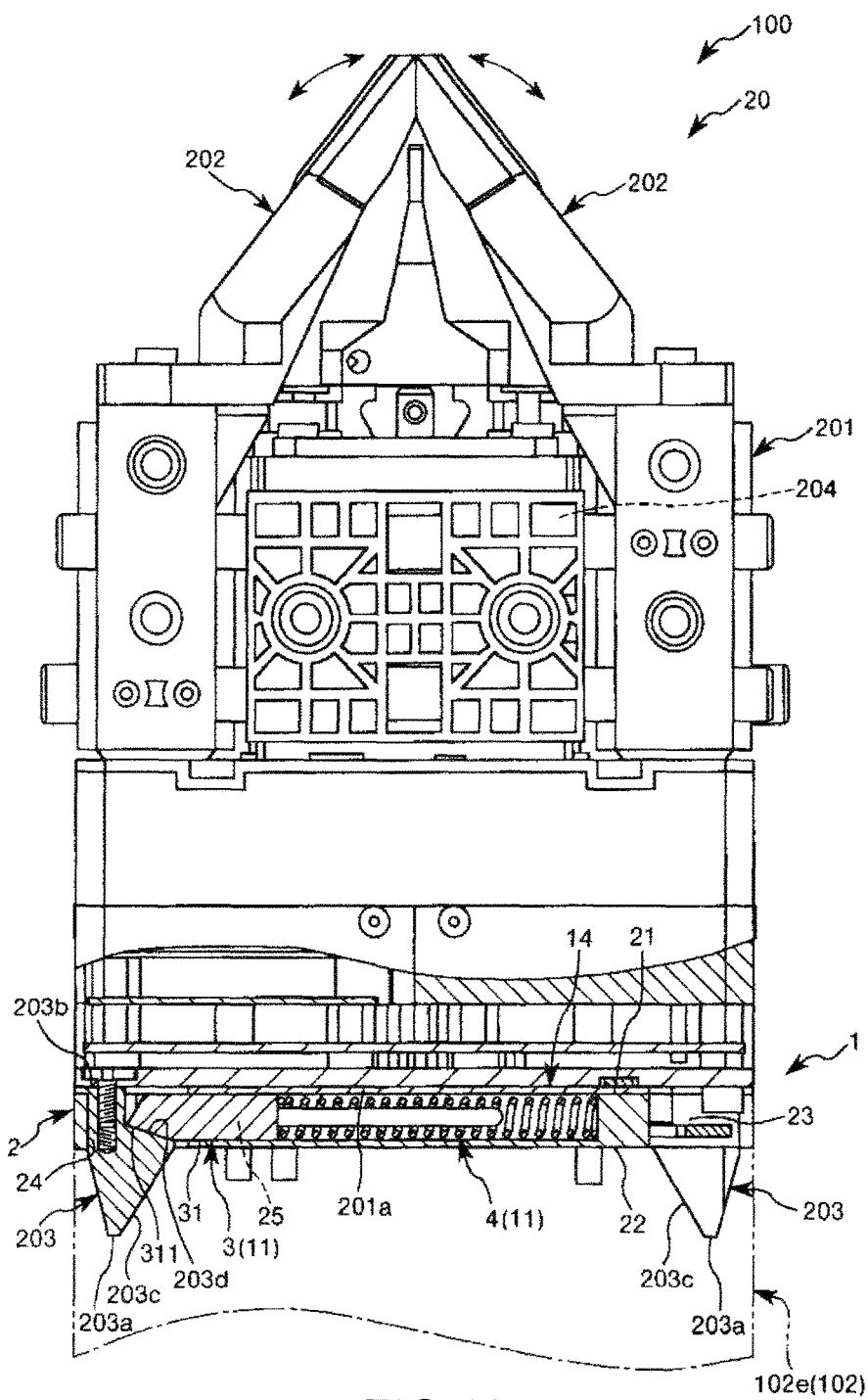
FIG. 10 is a partial longitudinal sectional view of the state shown in FIG. 9.
Figure 11:
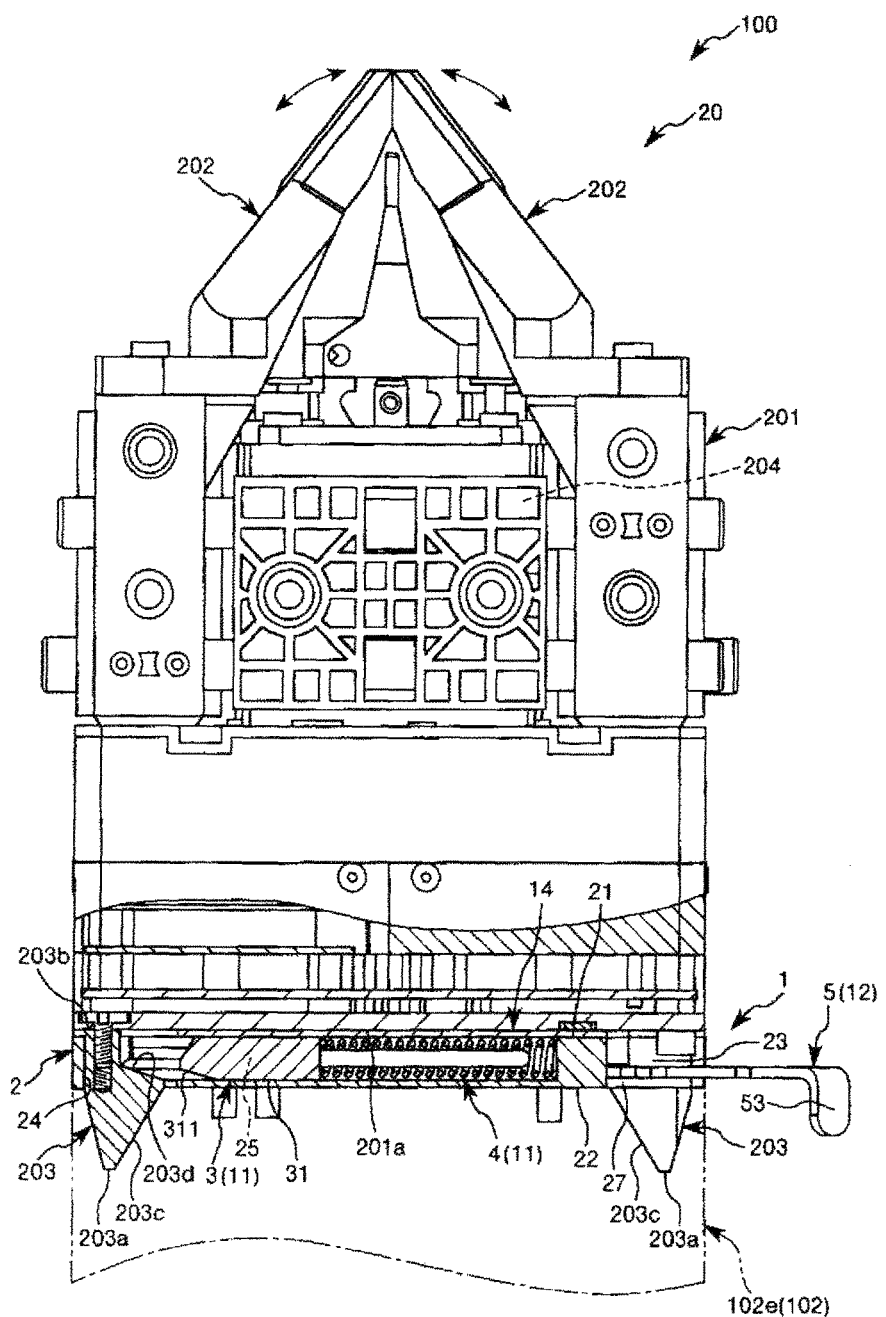
FIG. 11 is a partial longitudinal sectional view of the attaching and detaching device changed from the state shown in FIG. 9 to a detachable state.

FIG. 1 is a perspective view showing an embodiment in which a robot according to this embodiment is applied to a humanoid double-arm robot. FIG. 2 is a side view of an end effector attached to an arm of the robot shown in FIG. 1. FIG. 3 is a perspective view of the end effector shown in FIG. 2. FIG. 4 is a perspective view showing an attaching and detaching device according to this embodiment. FIGS. 5 and 6 are respectively perspective views showing operation states of detachment and attachment of an internal structure on the front side of the attaching and detaching device shown in FIG. 4. FIGS. 7 and 8 are respectively perspective views showing operation states of detachment and attachment of an internal structure on the rear side of the attaching and detaching device shown in FIG. 4. FIG. 9 is a perspective view showing a state in which the end effector is attached to the attaching and detaching device according to this embodiment. FIG. 10 is a partial longitudinal sectional view of the state shown in FIG. 9. FIG. 11 is a partial longitudinal sectional view of the attaching and detaching device changed from the state shown in FIG. 9 to a detachable state.

In the following explanation, for convenience of explanation, in FIG. 1, the upper side is referred to as "upper" or "above" and the lower side is referred to as "lower" or "below". In FIGS. 2, 10, and 11, the upper side is referred to as "front" or "distal end" and the lower side is referred to as "rear" or "proximal end". In FIGS. 3 and 9, the paper surface depth side is referred to as "front" or "distal end" and the paper surface near side is referred to as "rear" or "proximal end". In FIGS. 4 to 6, the paper surface near side is referred to as "front" or "distal end" and the paper surface depth side is referred to as "rear" or "proximal end". In FIGS. 7 and 8, the paper surface depth side is referred to as "front" or "distal end" and the paper surface near side is referred to as "rear" or "proximal end".

A robot 100 shown in FIG. 1 is a humanoid double-arm robot including a body section 101, two arms (robot arms) 102 provided above the body section 101, and a leg section 103 provided below the body section 101. The robot 100 can be used in, for example, a manufacturing process for manufacturing a precision instrument such as a watch. This manufacturing work is usually performed on a work table (not shown in the figure).

A bumper 101a is arranged on the front surface side of the body section 101. The distance in the horizontal direction between the robot 100 and the work table can be kept fixed by setting the bumper 101a in contact with the work table. Consequently, it is possible to accurately perform manufacturing work.

On the rear surface side of the body section 101, an image display device 101b including a liquid crystal monitor facing backward is arranged. The liquid crystal monitor can display, for example, the present state of the robot 100. The liquid crystal monitor includes a touch panel function and is also used as an operation section for performing setting of an operation for the robot 100.

The arms 102 are arm continuous bodies configured by coupling arm main bodies (elements) 102a, 102b, 102c, 102d, and 102e in order from the body section 101 side. An end effector 20 (the other structure) (see FIG. 2) can be detachably attached to the arm main body 102e (one structure) via an attaching and detaching device (an attaching and detaching unit) 1 (see FIG. 4). In this attached state, the arm main bodies 102a to 102e and the end effector 20 can pivot independently around pivot axes J1, J2, J3, J4, J5, J6, and J7.

Driving mechanisms (not shown in the figure) for respectively turning the arm main bodies 102a to 102e and the end effector 20 are incorporated in the arm main bodies 102a to 102e and the body section 101. The driving mechanism is not particularly limited, can be, for example, a mechanism including a motor, a reduction gear coupled to one end side of the motor, and an electromagnetic brake coupled to the other end side of the motor.

In the leg section 103, for example, a control device 104 including a CPU (Central Processing Unit) and configured to control the robot 100 is incorporated. In the bottom section of the leg section 103, a plurality of casters 103*a* are set at intervals in the horizontal direction. Consequently, the robot 100 can be moved and conveyed.

The robot 100 includes, in a portion corresponding to the head of the robot 100, an electronic camera 105 including a CCD (Charge Coupled Device) and a CMOS (Complementary Metal Oxide Semiconductor) and a signal lamp 106. The electronic camera 105 can pick up an image of, for example, assembly components on the work table. The signal lamp 106 includes LEDs configured to respectively emit, for example, red light, yellow light, and blue light. The LEDs are selected as appropriate according to the present state of the robot 100 and emit lights.

The end effector 20 is a robot hand used in a state in which the end effector 20 is attached to the arm main body 102*e* of the arm 102 via the attaching and detaching device 1. As shown in FIGS. 2, 10, and 11, the end effector 20 includes a main body section 201, a plurality of (e.g., two or three) fingers 202 arranged on the distal end side of the main body section 201, and two projecting sections 203 arranged on the proximal end side of the main boy section 201.

The external shape of the main body section 201 is formed in a substantially rectangular parallelepiped shape. A driving mechanism 204 configured to drive the fingers 202 is incorporated on the inside of the main body section 201.

The driving mechanism 204 includes, for example, a motor and a gear group including a plurality of gears that mesh with one another. The torque of the motor is transmitted to the fingers 202 via the gear group. Consequently, the fingers 202 can move close to and away from one another. When the fingers 202 move close to one another, the fingers 202 can hold an object such as a component. When the fingers 202 move away from one another from this holding state, the fingers 202 can release the object.

As shown in FIGS. 2 and 3, a plurality of terminals 205 project from a proximal end face 201*a* of the main body section 201. Via the terminals 205, the motor of the driving mechanism 204 is electrically connected to a battery incorporated in the leg section 103. Consequently, electric power can be supplied to the motor. The terminals 205 have elasticity on the base side and are so-called "spring contacts".

The projecting sections 203 project from the proximal end face 201*a* of the main body section 201 toward the proximal end direction, that is, toward the arms 102 in the attached state. The proximal end face 201*a* is formed in a substantially square shape. The projecting sections 203 are arranged near corners located on diagonal lines of the proximal end face 201*a*. The projecting section 203 includes a taper section 203*c*, the outer diameter of which gradually increases from a top section 203*a* thereof toward a base section 203*b* side. An engaging surface 203*d* inclining with respect to the proximal end face 201*a* is provided right under the taper section 203*c*. The engaging surface 203*d* is a portion that engages with the attaching and detaching device 1 (see FIG. 10).

Further, two guide pins 206 for performing positioning with the attaching and detaching device 1 project from the proximal end face 201*a* of the main body section 201 toward the proximal end direction. The guide pins 206 are arranged substantially on diagonal lines of the proximal end face 201*a* to be separated from each other as much as possible. The diagonal lines on which the guide pins 206 are arranged and the diagonal lines on which the projecting sections 203 are arranged are different.

The projecting length of the guide pins 206 is longer than the projecting length of the terminals 205. Therefore, the electrical contact of the terminals 205 is performed after the positioning of the end effector 20 and the attaching and detaching device 1 is performed. Consequently, when the end effector 20 is attached to the attaching and detaching device 1, it is possible to surely prevent the terminals 205 from being inadvertently pressed by the attaching and detaching device 1 and deformed.

The attaching and detaching device 1 is a device that detachably attaches the arm main body 102*e* of the arm 102 and the end effector 20. The attaching and detaching device 1 can take an attached state shown in FIGS. 9 and 10 and a detachable state shown in FIG. 11. The attached state is a state in which the arm main body 102*e* and the end effector 20 are coupled and the operation of the end effector 20 is possible. The detachable state is a state in which the end effector 20 is detachable from the arm main body 102*e*.

As shown in FIGS. 4 to 8, the attaching and detaching device 1 includes a base 2, an engaging mechanism 11, a releasing mechanism 12, a circuit board 13, and a lid body 14.

The base 2 is a plate member configured to support the engaging mechanism 11, the releasing mechanism 12, the circuit board 13, and the lid body 14. The base 2 is fixed to the distal end face of the arm main body 102*e* of the arm 102. A method of fixing the base 2 is not particularly limited. Examples of the method include a method by screwing. In the attached state, a surface 21 on the front side of the base 2 is opposed to the proximal end face 201*a* side of the main body section 201 of the end effector 20.

On a surface 22 on the rear side of the base 2, guide pins 28 for performing positioning with the arm main body 102*e* are projectingly provided (see FIGS. 7 to 9). Consequently, the attaching and detaching device 1 is fixed in a state in which the attaching and detaching device 1 is positioned with respect to the arm main body 102*e*.

The base 2 is obtained by applying machining to a tabular base material formed in a square shape. The base 2 includes a cutout section 23 formed on one side among the four sides along the direction in which the side extends. The corners of the base 2 are respectively chamfered or rounded.

Through-holes (insert-through holes) 24 are formed in the thickness direction of the base 2. Two through-holes 24 are formed on a diagonal line of the base 2. In the attached state shown in FIG. 9, the projecting sections 203 of the end effector 20 can be respectively inserted through the through-holes 24. Consequently, the projecting sections 203 can engage with the engaging members 3 of the engaging mechanism 11 (see FIG. 10).

As shown in FIGS. 5 and 6, on the surface 21 on the front side of the base 2, guide grooves 25 for guiding the engaging members 3 are formed to extend along the left right direction in the figure. The guide grooves 25 respectively communicate with the through-holes 24. The engaging members 3 can stably engage with the projecting sections 203 of the end effector 20 through the guide grooves 25 formed in this way. Therefore, an engaging state of the engaging members 3 is easily maintained. When the engaging members 3 are inserted into the guide grooves 25, the engaging members 3 are prevented from projecting from the surface 21 on the front side of the base 2. Therefore, it is possible to suppress the thickness of the entire attaching and detaching device 1. The guide grooves 25 contribute to a reduction in the thickness (a reduction in the size) of the attaching and detaching device 1.

On the surface 21 on the front side of the base 2, a recess 26 in which a link mechanism 6 included in the releasing mechanism 12 is housed and arranged is formed in a position different from the guide grooves 25. The recess 26 prevents the link mechanism 6 from projecting from the surface 21 on the front side of the base 2. Consequently, like the guide grooves 25, the recess 26 contributes to the suppression of the thickness of the entire attaching and detaching device 1. It is possible to attain a reduction in the thickness of the attaching and detaching device 1.

Further, on the surface 21 on the front side of the base 2, guide holes 29 into which the guide pins 206 of the end effector 20 are inserted are formed. Consequently, positioning of the attaching and detaching device 1 and the end effector 20 is performed.

As shown in FIGS. 7 to 9, on the surface 22 on the rear side of the base 2, a recess 27 in which an operation lever 5 included in the releasing mechanism 12 is housed and arranged is formed. The recess 27 prevents the operation lever 5 from projecting from the surface 22 on the rear side of the base 2. Consequently, in conjunction with the guide groves 25 and the recess 26, the recess 27 further contributes to the suppression of the thickness of the entire attaching and detaching device 1.

A material forming the base 2 is not particularly limited. Various metal materials such as aluminum and alloys of aluminum can be used.

As shown in FIGS. 5 and 6, the engaging mechanism 11 includes the engaging members 3 and compression coil springs 4 functioning as urging members configured to urge the engaging members 3.

The engaging members 3 are respectively inserted into the guide grooves 25 of the base 2 and supported movably along the guide grooves 25, that is, along the surface direction of the base 2. Consequently, the engaging members 3 can move to an engaging position (see FIGS. 7 and 10) where the engaging members 3 engage with the projecting sections 203 of the end effector 20 in the attached state and a disengaging position (see FIGS. 5, 8, and 11) where the engagement is released.

As shown in FIGS. 10 and 11, the engaging member 3 is configured by a plate piece. An engaging surface 311 inclining with respect to the surface direction of the base 2 is formed on a surface 31 on the rear side of the engaging member 3. In the engaging position, the engaging surface 311 engages with the engaging surface 203*d* of the projecting section 203 inclining with respect to the surface direction of the base 2 like the engaging surface 311 (see FIG. 10). The attached state is surely maintained by the engagement. Therefore, the end effector 20 is surely prevented from being detached from the arm 102. When the engaging member 3 moves from the engaging position to the disengaging position, the attaching and detaching device 1 changes to the detachable state (see FIG. 11).

As shown in FIG. 5, the engaging members 3 are respectively inserted into the guide grooves 25 extending from the through-holes 24 present on the diagonal lines of the base 2. Therefore, the engaging members 3 are arranged around substantially the center of the base 2. Consequently, when the engaging members 3 are present in the engaging position, it is possible to stably maintain the attached state.

In this embodiment, the number of the engaging members 3 is two to correspond to the projecting sections 203 of the end effector 20. However, the number the engaging members 3 is not limited to this. For example, the number of the engaging members 3 may be one or three or more if the number corresponds to the number of the projecting sections 203.

The compression coil springs 4 are members that urge the engaging members 3 in a direction in which the engaging members 3 engage with the projecting sections 203 of the end effector 20 (an engaging direction), that is, a direction toward the engaging position. As shown in FIGS. 5 and 6, two compression coil springs 4 are arranged side by side on the opposite side of the engaging surface 311 with respect to one engaging member 3. The compression coil springs 4 are inserted into the guide groove 25 of the base 2 together with the engaging member 3. Consequently, it is possible to use compression coil springs having a relatively small outer diameter as the compression coil springs 4. Therefore, the compression coil springs 4 contribute to a reduction in the size of the attaching and detaching device 1.

In the guide groove 25, a partitioning section 251 formed in a tabular shape is provided between the two compression coil springs 4. Consequently, it is possible to prevent the compression coil springs 4 from meshing with each other. Therefore, it is possible to appropriately apply an urging force to the engaging member 3.

In this embodiment, the urging member for urging the engaging ember 3 is the compression coil spring 4. However, the urging member is not limited to this and may be, for example, a tensile coil spring.

Materials forming the members included in the engaging mechanism 11 are not particularly limited. Various metal materials such as stainless steel can be used.

Concerning the setting of the compression coil springs 4, in this embodiment, the two compression coil springs 4 are arranged side by side with respect to the one engaging member 3. However, the setting of the compression coil springs 4 is not limited to this. All the set engaging members 3 are connected. When any one of the engaging members 3 is urged, a force of the urging is transmitted to all the engaging members 3. Therefore, at least a pair of the compression coil springs 4 only has to be provided in the attaching and detaching device 1.

The operation of the engaging mechanism 11 configured as explained above is explained.

In a state in which the attaching and detaching device 1 is not in the attached state yet, the engaging members 3 are located in the engaging position by the urging force of the compression coil springs 4. The attaching and detaching device 1 in this state is brought close to the end effector 20 from the proximal end side. As the attaching and detaching device 1 is brought close to the end effector 20, the projecting sections 203 of the end effector 20 are inserted into the through-holes 24 of the base 2. Consequently, the engaging members 3 come into contact with the taper sections 203*c* of the projecting section 203 and slide on the taper sections 203*c*. At this point, the engaging members 3 move toward the disengaging position resisting the urging force of the compression coil springs 4. Thereafter, when the engaging members 3 climb over the taper sections 203*c*, the engaging members 3 are located in the engaging position again by the urging force of the compression coil springs 4. Consequently, the attaching and detaching device 1 changes to the attached state in which the end effector 20 is attached to the arm 102 via the attaching and detaching device 1 (see FIGS. 9 and 10).

To attach the end effector 20 to the attaching and detaching device 1 in this way, attaching operation for the end effector 20 can be performed by simple operation of pushing in the attaching and detaching device 1 toward the end effector 20.

As shown in FIGS. 5 to 9, the releasing mechanism 12 includes the operation lever (a release operation lever) 5 configured to release the attached state and change the attached state to the detachable state (hereinafter referred to as "releasing operation") and the link mechanism 6 configured to couple the two engaging members 3.

As shown in FIGS. 7 to 9, the operation lever 5 is formed in a long shape and configured by a plate member including bent sections 51 bent in a plurality of parts in a longitudinal direction of the operation lever 5.

The operation lever 5 is movably arranged in the recess 27 formed on the surface 22 on the rear side of the base 2. When the operation lever 5 is operated to move, a force of the operation is transmitted to the engaging members 3 via the link mechanism 6. One end of the operation lever 5 functions as a pressing section 53 pressed when the operation lever 5 is operated to move.

When the operation lever 5 is in a state shown in FIG. 7 (FIG. 6), the engaging members 3 are present in the engaging position. When the operation lever 5 is in a state shown in FIG. 8 (FIG. 5), the engaging members 3 are present in the disengaging position. In the former state, when the operation lever 5 is viewed from the proximal end direction, a portion on the outer side of the operation lever 5, that is, a projecting portion 52 projecting from the recess 27 is located in the cutout section 23 and drawn further to the inner side than the contour of the arm 102. Consequently, it is possible to prevent the projecting portion 52 from colliding with members, devices, and the like around the robot 100 during the operation of the arm 102. Therefore, the operation of the arm 102 is safely performed (see FIG. 9). In the latter state, the projecting portion 52 projects further than the contour of the arm 102. Therefore, it is possible to grasp that the attaching and detaching device 1 is in the detached state.

As shown in FIGS. 5 and 6, the link mechanism 6 includes long elements 61 and 62 formed in a linear shape. The link mechanism 6 is drivably arranged in the recess 26 formed on the surface 21 on the front side of the base 2. On the other hand, as explained above, the operation lever 5 is arranged on the rear side of the base 2. In this way, the operation lever 5 and the link mechanism 6 are respectively distributedly arranged on both the surfaces of the base 2 according to functions of the operation lever 5 and the link mechanism 6. Consequently, it is easy to perform maintenance of, for example, the releasing mechanism 12.

A halfway part in a longitudinal direction of the element 61 is coupled to an end of the operation lever 5 on the opposite side of the pressing section 53 from the rear side via a coupling section 121. The coupling section 121 is a pivotable pivoting supporting section (see FIGS. 7 and 8). One end of the element 61 is coupled to one engaging member 3 via a coupling section 122. The other end of the element 61 is coupled to one end of the element 62 via a coupling section 123 (see FIGS. 5 and 6). The coupling section 122 may fixedly couple the element 61 and the one engaging member 3. The coupling section 123 is a pivotable pivoting supporting section.

In the element 61, a guide groove 611 is formed in a portion between the coupling section 121 and the coupling section 122. A guide pin 261 projecting from the recess 26 of the base 2 is inserted into the guide groove 611. Consequently, the link mechanism 6 can be stably driven in association with the operation lever 5. A driving limit of the link mechanism 6 can be regulated. Therefore, it is possible to prevent excess driving of the link mechanism 6 by the operation lever 5.

The other end of the element 62 is coupled to the other engaging member 3 via a coupling section 124. The coupling section 124 is a pivotable pivoting supporting section. The center in a longitudinal direction of the element 62 is coupled to the base 2 via a coupling section 125. The coupling section 125 is also a pivotable pivoting supporting section.

As shown in FIGS. 7 and 8, a toggle mechanism is configured by the operation lever 5 and the element 61 of the link mechanism 6. The "toggle mechanism" is one of link mechanisms configured by two elements (nodes) and one slider. In this embodiment, one element of the two elements is equivalent to the operation lever 5. The slider is equivalent to the element 61. The remaining element of the two elements is an element 129. The element 129 is formed in a long shape. One end of the element 129 is coupled to the base 2 via a coupling section 126. The other end of the element 129 is coupled to the operation lever 5 via a coupling section 127. With the toggle mechanism, it is possible to operate the operation lever 5 with as small a force as possible and easily and surely move the engaging member 3 coupled to the element 61 and the engaging member 3 coupled to the element 62.

The operation of the releasing mechanism 12 having the configuration explained above is explained.

First, the operation lever 5 of the releasing mechanism 12 is operated from the attached state shown in FIG. 11 to change from FIG. 7 (FIG. 9) to FIG. 8. According to the operation, the element 61 of the link mechanism 6 is moved from FIG. 6 to FIG. 5. Consequently, it is possible to move the engaging member 3 coupled to the element 61 from the engaging position shown in FIG. 6 to the disengaging position shown in FIG. 5 resisting the urging force of the compression coil springs 4.

When the element 61 moves, the element 62 coupled to the element 61 pivots counterclockwise around the coupling section 125 from FIG. 6 to FIG. 5. Consequently, it is also possible to move the engaging member 3 coupled to the element 62 from the engaging position shown in FIG. 6 to the disengaging position shown in FIG. 6 resisting the urging force of the compression coil springs 4.

When the engaging members 3 are moved to the disengaging position in this way, it is possible to change the attaching and detaching device 1 to the detachable state in which the end effector 20 is disengageable from the attaching and detaching device 1 (see FIG. 10).

As explained above, when the attaching and detaching device 1 is changed to the detachable state, the detaching operation for the attaching and detaching device 1 can be performed by simple operation of moving the operation lever 5. The two engaging members 3 can be collectively moved by the link mechanism 6. Consequently, it is possible to quickly perform the detaching operation.

Materials forming the members included in the releasing mechanism 12 are not particularly limited. Various metal materials such as stainless steel can be used.

As shown in FIGS. 5 and 6, the circuit board 13 is arranged and fixed in a recess 211 formed in the center of the surface 21 on the front side of the base 2. As a method of fixing the circuit board 13, for example, in this embodiment, a method of fixing the circuit board 13 using a plurality of thin head screws 151 is adopted.

The circuit board 13 includes a substrate 131 on which a conductor pattern (not shown in the figures) is formed and a plurality of terminals 132 supported by the substrate 131. The terminals 132 are electrically connected to the terminals 205 of the end effector 20 in the attached state. Consequently, as explained above, electric power is supplied to the driving mechanism 204 and the driving mechanism 204 can operate.

As shown in FIG. 4, the lid body 14 is a member formed in a tabular shape arranged and fixed on the surface 21 on the front side of the base 2. Consequently, it is possible to cover and protect the engaging mechanism 11 and the like. As a method of fixing the lid body 14 to the base 2, for example, in this embodiment, a method of fixing the lid body 14 using a plurality of thin head screws 152 is adopted.

In the lid body 14, a plurality of opening sections 141 are provided from which the through-holes 24 and the guide holes 29 of the base 2, the terminals 132 of the circuit board 13, and the like are exposed. The opening sections 141 are respectively formed by through-holes formed to pierce through the lid body 14 and cutout sections formed by cutting out the lid body 14.

A material forming the lid body 14 is not particularly limited. Various metal materials such as aluminum and alloys of aluminum can be used.

The attaching and detaching device and the robot according to this embodiment are explained above. However, the invention is not limited to this. The sections included in the attaching and detaching device and the robot can be replaced with sections having arbitrary configurations that can show the same functions. Further, arbitrary components may be added.

In the attaching and detaching device and the robot according to this embodiment, arbitrary two or more components (features) in the embodiment may be combined.

In the embodiment, the robot is the humanoid double-arm robot including the two arms. However, the invention is not limited to this. For example, the number of arms may be one or three or more.

Besides the humanoid robot, the robot may be a construction machine such as a crane and apparatuses set in immobile properties such as an elevator and an escalator.

The end effector is not limited to the end effector configured to hold an object and may be, for example, an end effector configured to attract an object.

Second Embodiment

Figure 12:
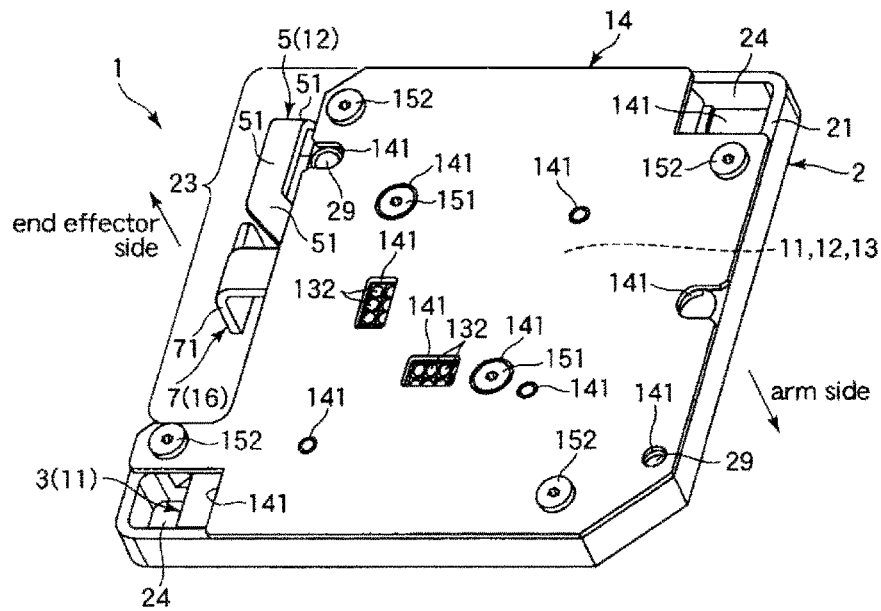
FIG. 12 is a perspective view showing an attaching and detaching device according to a second embodiment.
Figure 13:
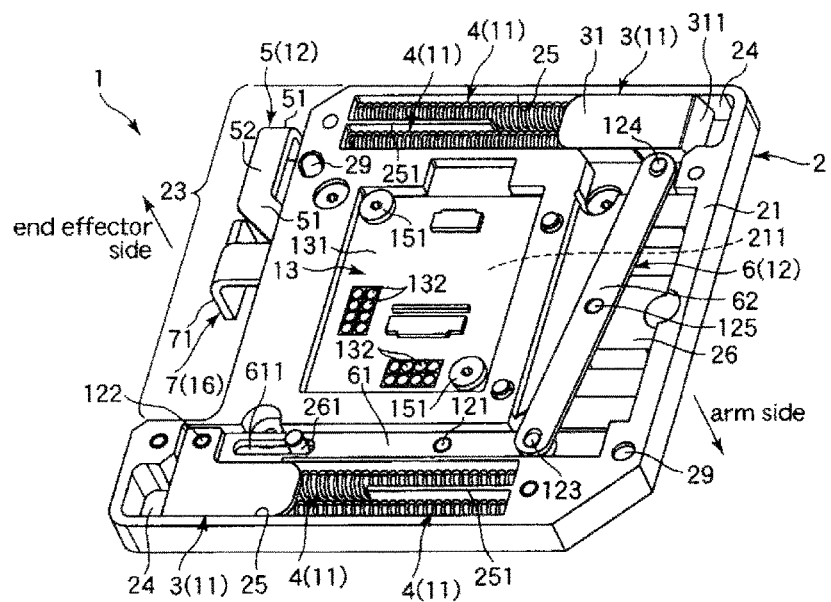
FIG. 13 is a perspective view showing an attached state of an internal structure on the front side of the attaching and detaching device shown in FIG. 12.
Figure 14:
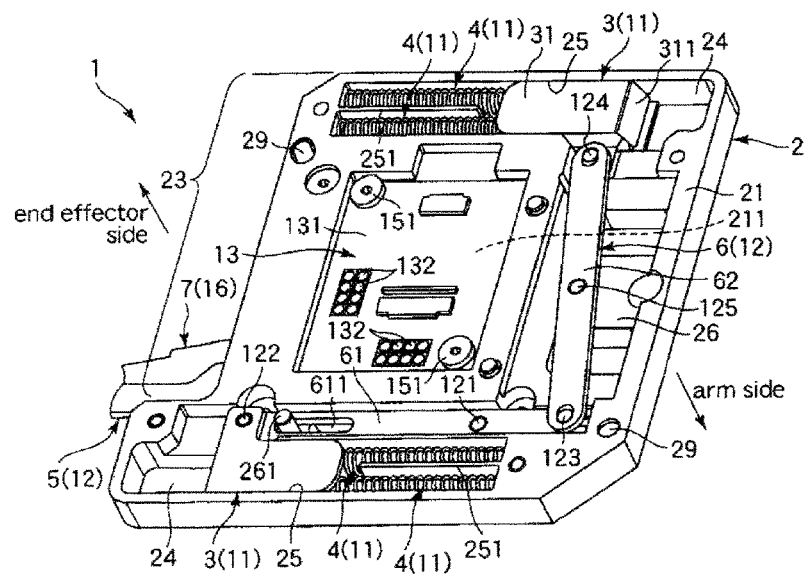
FIG. 14 is a perspective view showing a detached state of the internal structure on the front side of the attaching and detaching device shown in FIG. 12.
Figure 15:
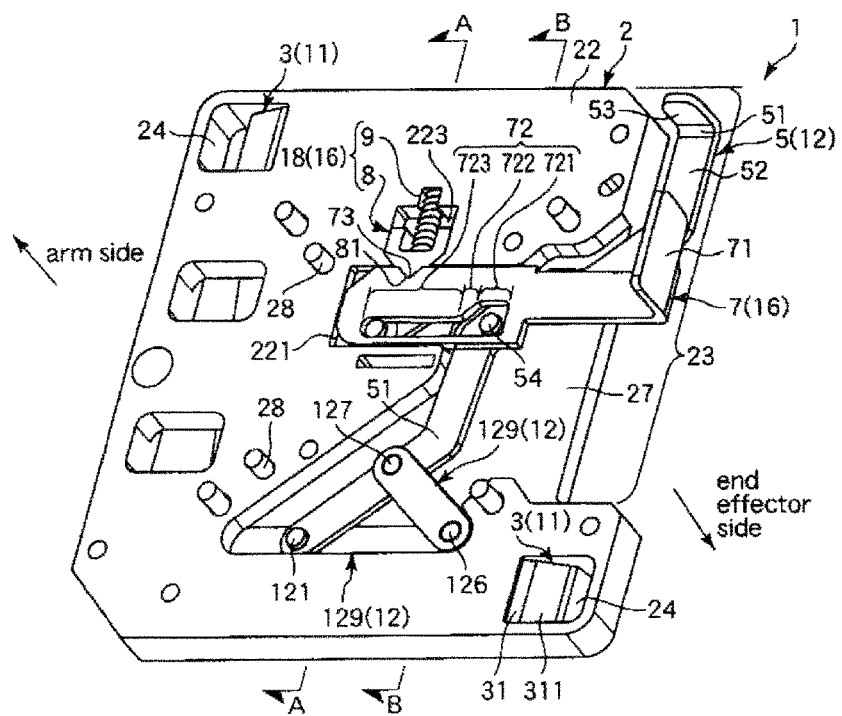
FIG. 15 is a perspective view showing a prohibiting state of a lever for lock of an internal structure on the rear side of the attaching and detaching device shown in FIG. 12.
Figure 16:
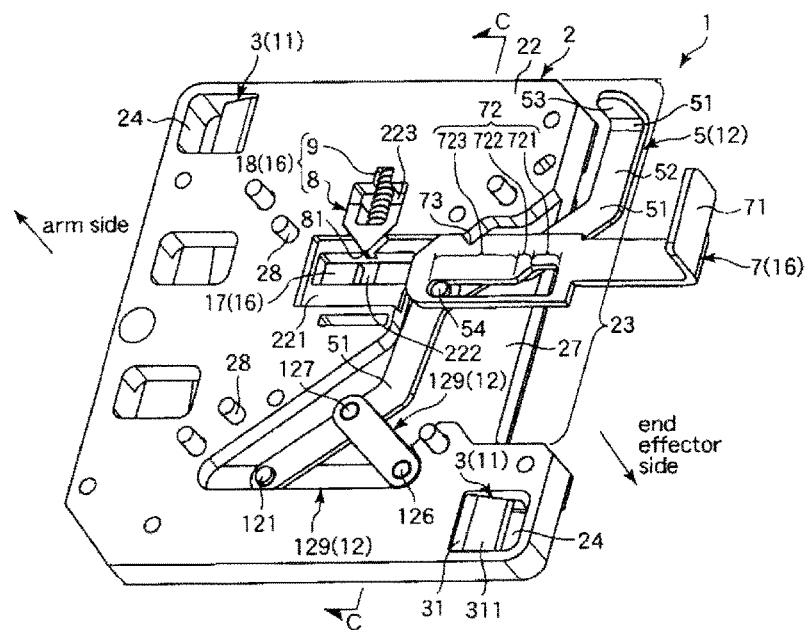
FIG. 16 is a perspective view showing a permitting state of the lever for lock of the internal structure on the rear side of the attaching and detaching device shown in FIG. 12.
Figure 17:
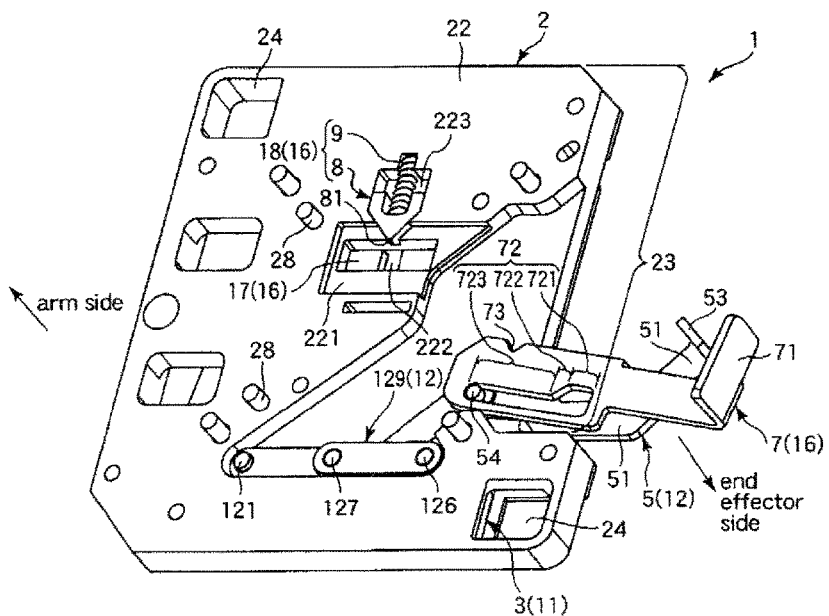
FIG. 17 is a perspective view showing a detached state of the internal structure on the rear side of the attaching and detaching device shown in FIG. 12.
Figure 18:
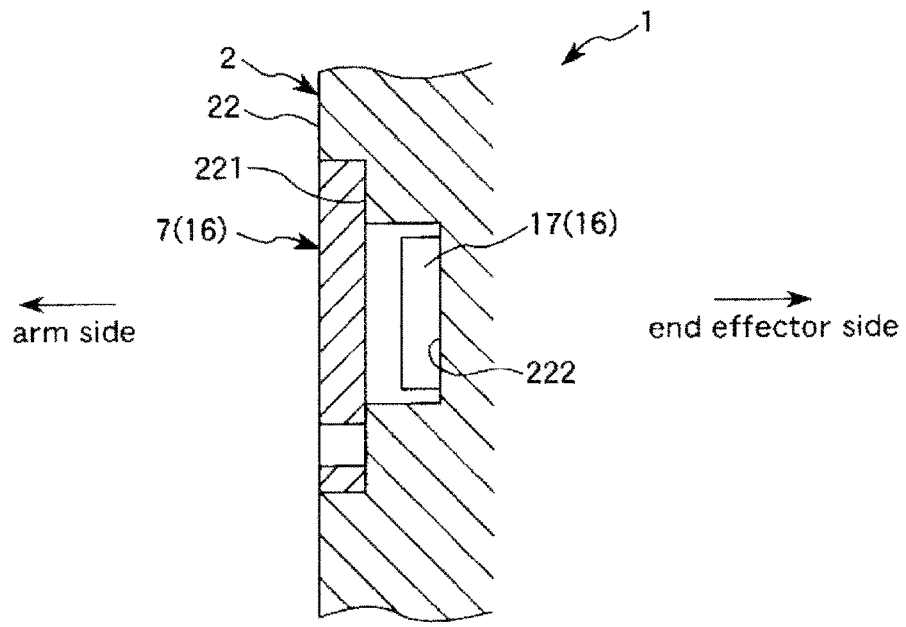
FIG. 18 is a sectional view taken along line A-A in FIG. 15.
Figure 19:
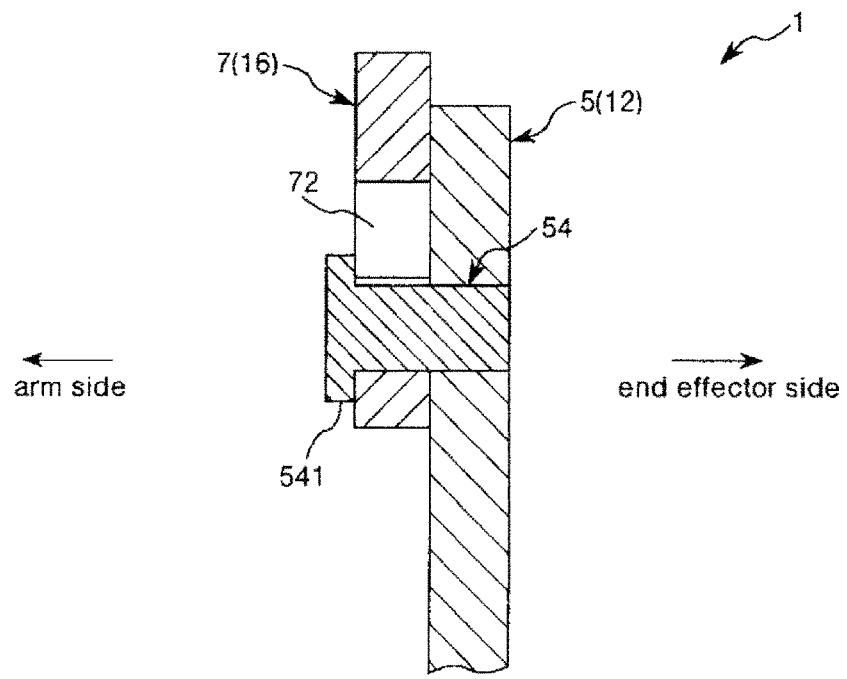
FIG. 19 is a sectional view taken along line B-B in FIG. 15.
Figure 20:
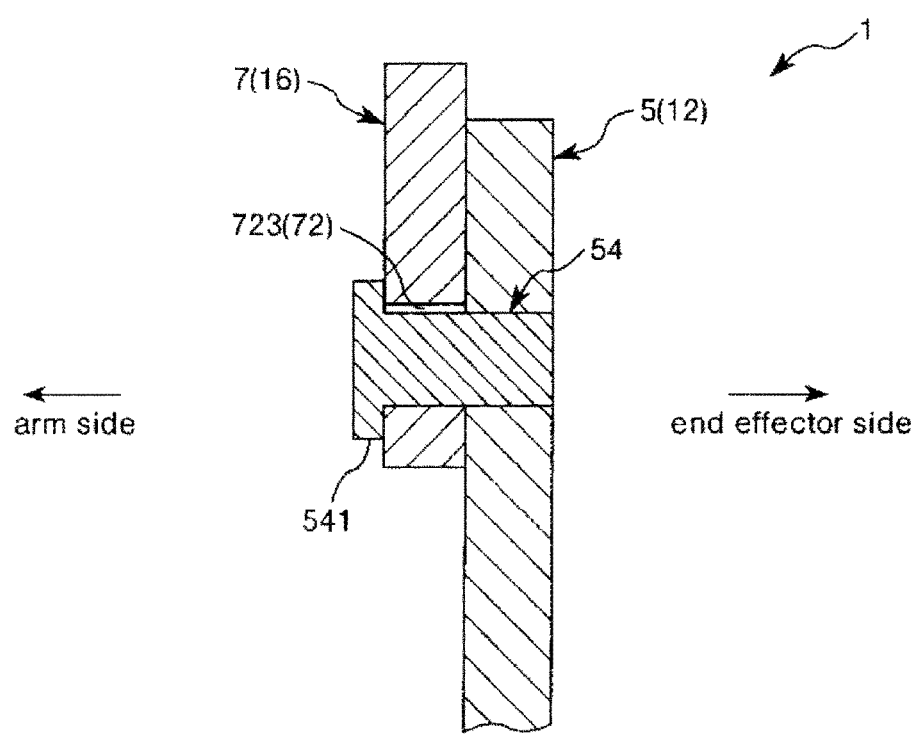
FIG. 20 is a sectional view taken along line C-C in FIG. 16.
Figure 21:
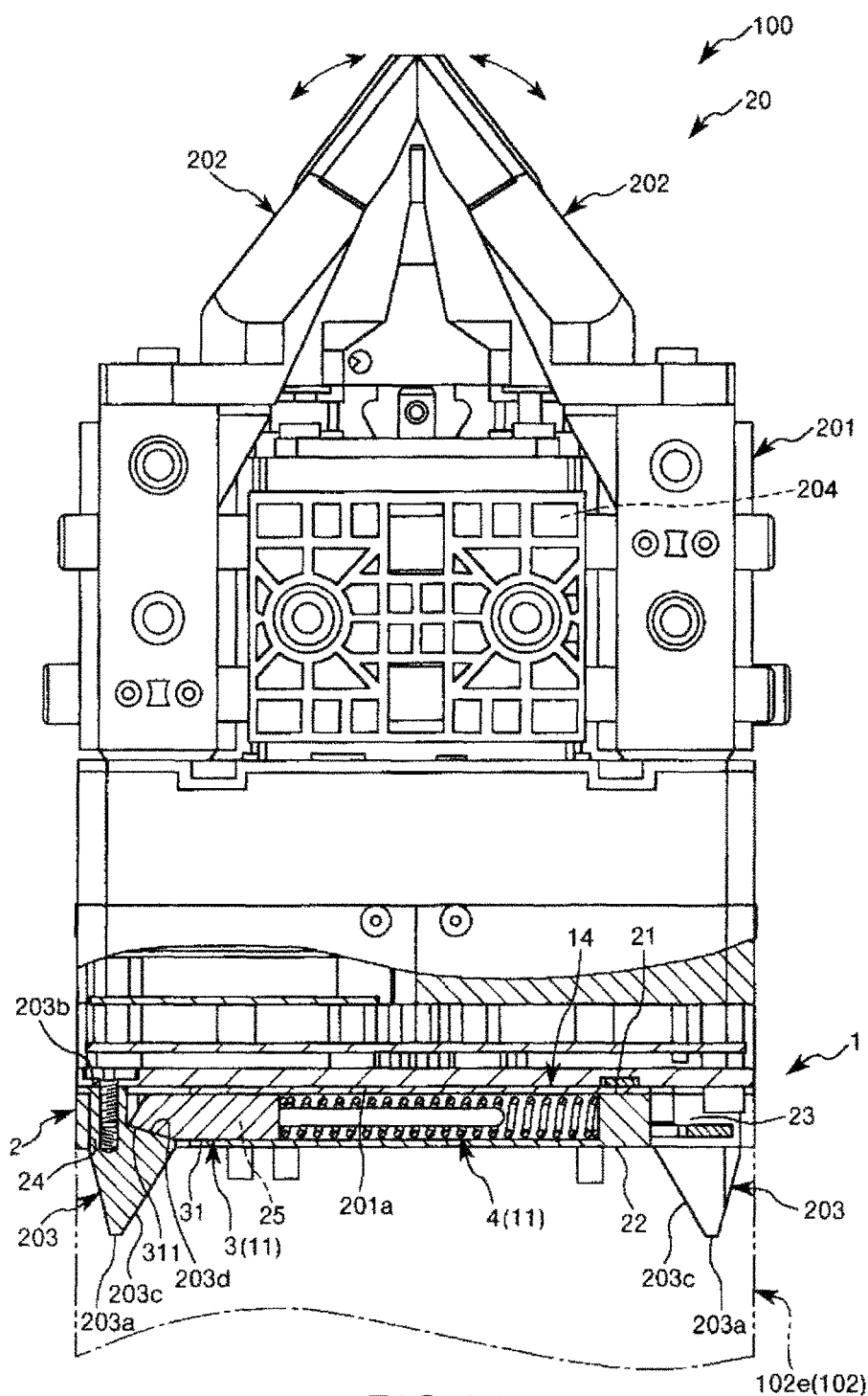
FIG. 21 is a partial longitudinal sectional view showing a state in which an end effector is attached to the attaching and detaching device according to the second embodiment.
Figure 22:
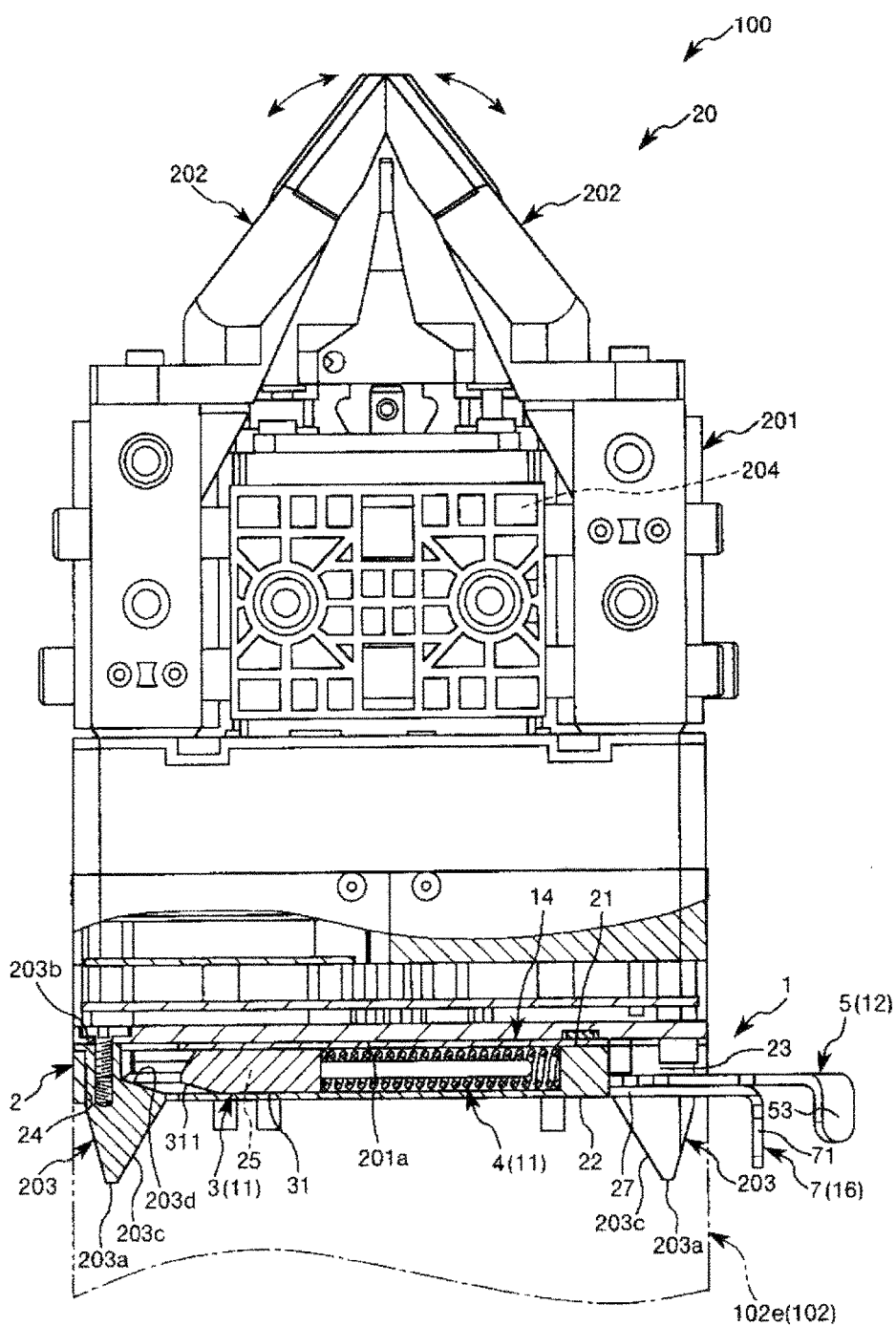
FIG. 22 is a partial longitudinal sectional view of the attaching and detaching device changed from the state shown in FIG. 21 to a detachable state.
Figure 23:
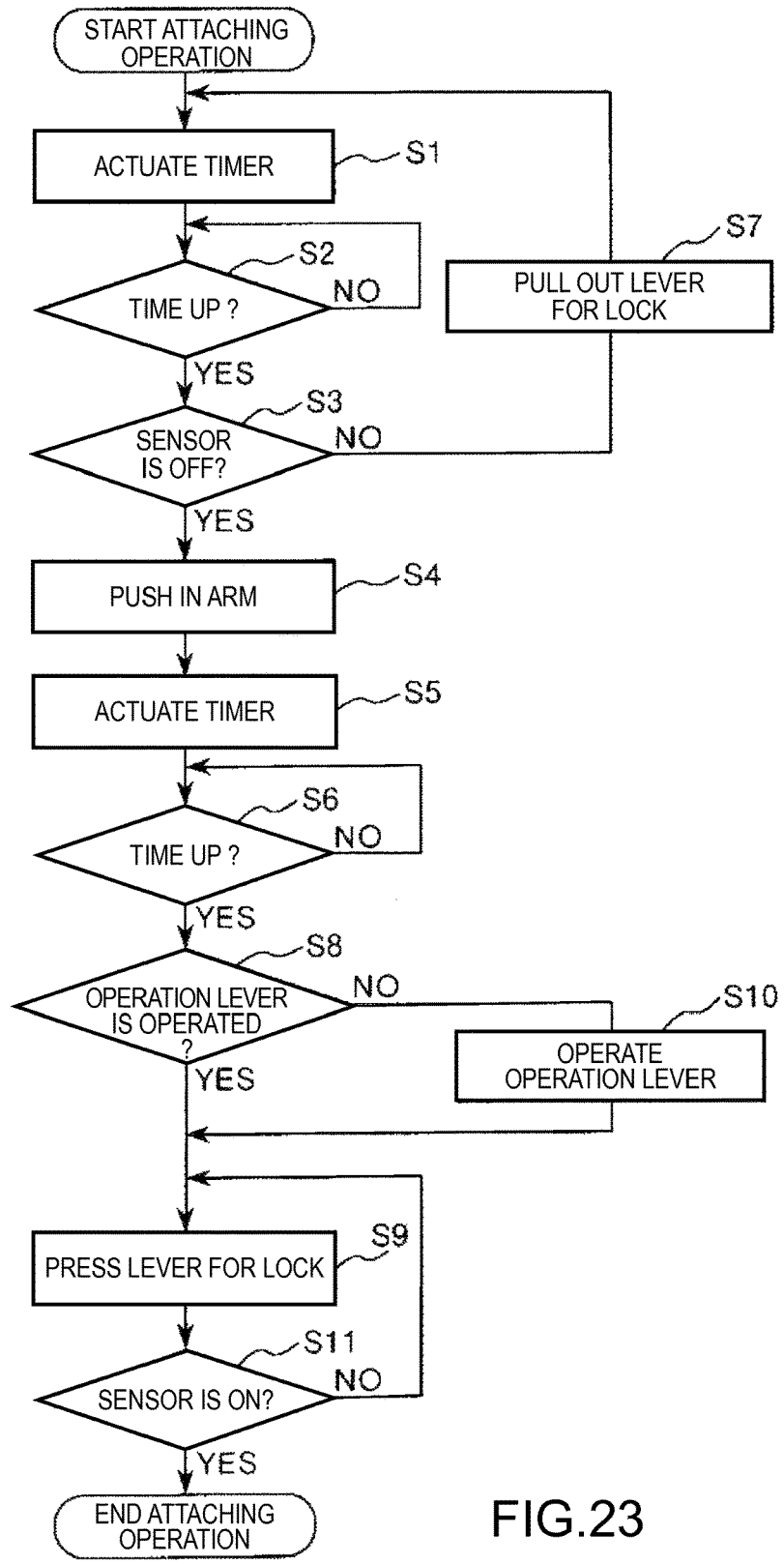
FIG. 23 is a flowchart for explaining a process until the end effector is attached to the attaching and detaching device according to the second embodiment.
Figure 24:
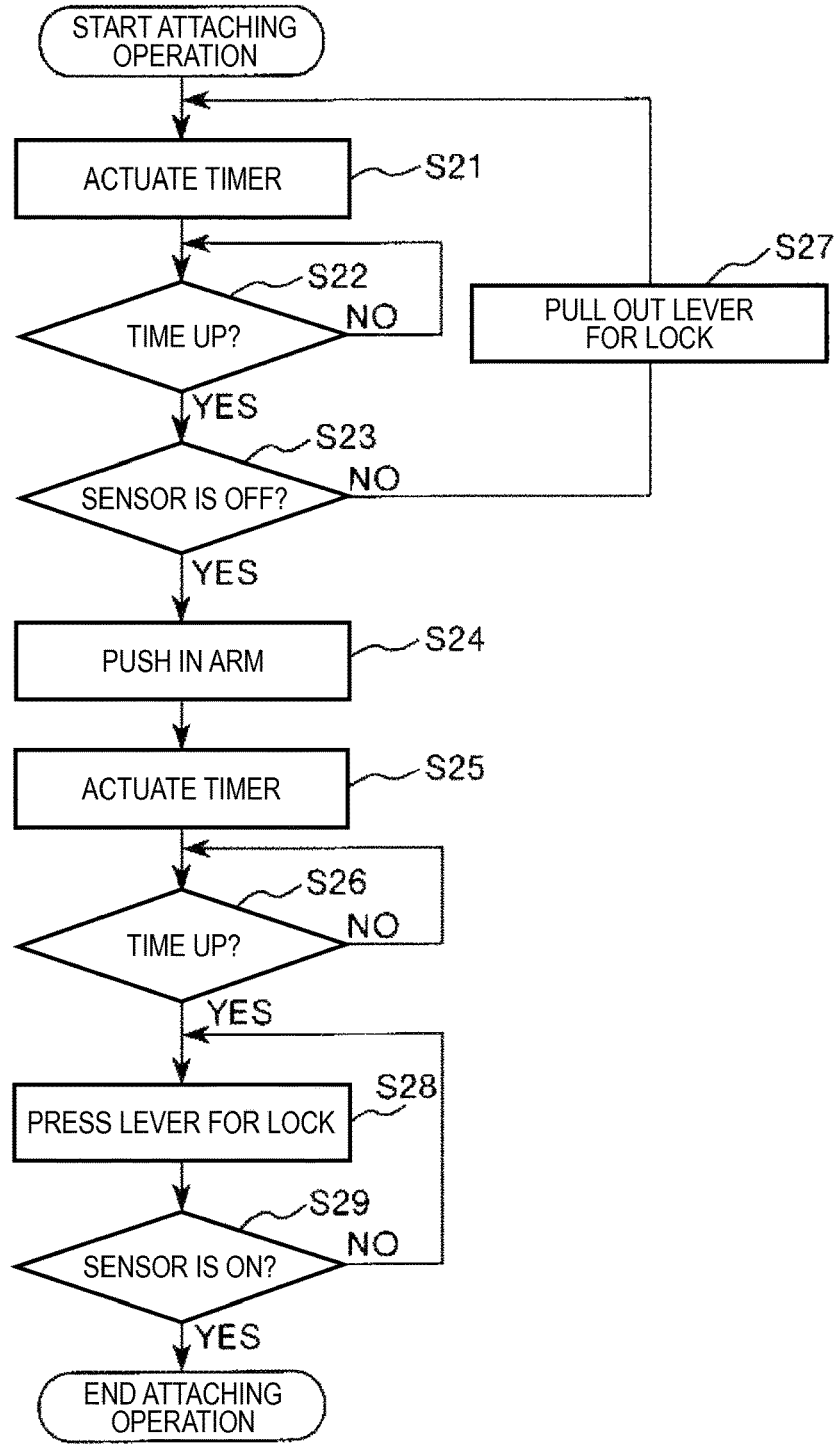
FIG. 24 is a flowchart for explaining a process until the end effector is attached to the attaching and detaching device according to the second embodiment.

FIG. 12 is a perspective view showing an attaching and detaching device according to this embodiment. FIGS. 13 and 14 are respectively perspective views showing an attached state and detached state of an internal structure on the front side of the attaching and detaching device shown in FIG. 12. FIGS. 15 to 17 are respectively perspective views showing a prohibiting state, a permitting state, and a detached state of a lever for lock of an internal structure on the rear side of the attaching and detaching device shown in FIG. 12. FIG. 18 is a sectional view taken along line A-A in FIG. 15. FIG. 19 is a sectional view taken along line B-B in FIG. 15. FIG. 20 is a sectional view taken along line C-C in FIG. 16. FIG. 21 is a partial longitudinal sectional view showing a state in which an end effector is attached to the attaching and detaching device according to this embodiment. FIG. 22 is a partial longitudinal sectional view of the attaching and detaching device changed from the state shown in FIG. 21 to a detachable state. FIGS. 23 and 24 are flowcharts for explaining a process until the end effector is attached to the attaching and detaching device according to this embodiment.

In the following explanation, for convenience of explanation, in FIGS. 21 and 22, the upper side is referred to as "front" or "distal end" and the lower side is referred to as "rear" or "proximal end". In FIGS. 12 to 14, the paper surface near side is referred to as "front" or "distal end" and the paper surface depth side is referred to as "rear" or "proximal end". In FIGS. 15 to 17, the paper surface depth side is referred to as "front" or "distal end" and the paper surface near side is referred to as "rear" or "proximal end". In FIGS. 18 to 20, the right side is referred to as "front" or "distal end" and the left side is referred to as "rear" or "proximal end".

The attaching and detaching device 1 in this embodiment is different from the attaching and detaching device 1 in the first embodiment in that the operation lever 5 includes a lock mechanism 16 including a lever for lock 7 that can take a prohibiting state for prohibiting releasing operation and a permitting state for permitting the releasing operation. In the following explanation, components same as the components in the first embodiment are denoted by the same reference numerals and signs and explanation of the components is omitted or simplified.

As shown in FIGS. 12 to 17, the attaching and detaching device 1 includes the base 2, the engaging mechanism 11, the releasing mechanism 12, the lock mechanism 16, the circuit board 13, and the lid body 14.

The base 2 is a plate member configured to support the engaging mechanism 11, the releasing mechanism 12, the lock mechanism 16, the circuit board 13, and the lid body 14.

As shown in FIGS. 15 to 17, on the surface 22 on the rear side of the base 2, a recess 27 in which the operation lever 5 included in the releasing mechanism 12 is housed and arranged and a recess 221 that is shallower than the recess 27 and in which the lever for lock 7 included in the lock mechanism 16 is housed and arranged are formed. The lever for lock 7 is prevented from projecting from the surface 22 on the rear side of the base 2 by the recess 221. Consequently, in conjunction with the guide grooves 25 and the recess 26, the recess 27 and the recess 221 contribute to suppressing the thickness of the entire attaching and detaching device 1.

The halfway part in the longitudinal direction of the element 61 is coupled to an end of the operation lever 5 on the opposite side of a finger hook section 55 from the rear side via the coupling section 121.

While the arm 102 in the attached state is operating, when the operation lever 5 collides with, for example, the periphery (a wall in a room, etc.) of the robot 100 and is operated, the engaging members 3 sometimes move to the disengaging position. As a result, it is likely that the attaching and detaching device 1 inadvertently changes to the detachable state in which the end effector 20 is detachable from the attaching and detaching device 1. However, the robot 100 is configured to be capable of preventing the attaching and detaching device 1 from changing to the inadvertent detachable state. This configuration is explained below.

As shown in FIGS. 15 to 17, the lock mechanism 16 includes the lever for lock 7, a proximity sensor 17, and a fixing section 18.

The lever for lock 7 is movably arranged in the recess 221 formed on the surface 22 on the rear side of the base 2 and overlaps the operation lever 5. According to the movement of the lever for lock 7, the lever for lock 7 can take the prohibiting state shown in FIG. 15 for prohibiting the operation lever 5 to perform releasing operation and the permitting state shown in FIG. 16 for permitting the operation lever 5 to perform the releasing operation.

The lever for lock 7 is configured by a plate member formed in a long shape. The lever for lock 7 has an end portion being bent and functions as a finger hook section 71 on which a finger of an operator is hooked when the lever for lock 7 is operated to move. It is possible to change the lever for lock 7 from the prohibiting state to the permitting state by hooking the finger on the finger hook section 71 and directly pulling the lever for lock 7 along a longitudinal direction of the lever for lock 7. On the other hand, it is possible to change the lever for lock 7 from the permitting state to the prohibiting state by hooking the finger on the finger hook section 71 and directly pushing the lever for lock 7 in a direction opposite to the longitudinal direction.

As shown in FIGS. 15 to 17, a cam groove 72 is provided along the longitudinal direction of the lever for lock 7 in a portion of the lever for lock 7 on the opposite side of the finger hook section 71. The cam groove 72 can be divided into a first portion 721, a second portion 722, and a third portion 723 respectively having different widths.

The first portion 721 is a portion located on the right side in FIGS. 15 to 17 and having maximum width among the first to third sections 721 to 723.

The third portion 723 is a portion located on the left side in FIGS. 15 to 17 and having minimum width among the first to third sections 721 to 723.

The second portion 722 is a portion located between the first portion 721 and the third portion 723 and having continuously changing width.

On the other hand, a cam follower 54 inserted into the cam groove 72 is provided in the operation lever 5. The cam follower 54 projects toward the rear side in a halfway part in the longitudinal direction of the operation lever 5. As shown in FIGS. 19 and 20, the cam follower 54 includes, at the top of the cam follower 54, a flange section 541 having an expanded outer diameter. The flange section 541 projects from the cam groove 72. The outer diameter of the flange section 541 is larger than the width of the third portion 723.

As shown in FIG. 15, in the prohibiting state, the cam follower 54 is located in the first portion 721 of the cam groove 72. When the lever for lock 7 is pulled as explained above from this state, the cam follower 54 passes the first portion 721 to the second portion 722 of the cam groove 72 and reaches the third portion 723 as shown in FIG. 16. At this point, the lever for lock 7 changes to the permitting state.

In the permitting state, as shown in FIG. 20, the flange section 541 of the cam follower 54 engages with the third portion 723. Consequently, the lever for lock 7 and the operation lever 5 are coupled. Therefore, it is possible to prevent the lever for lock 7 from being detached and, for example, lost.

In this embodiment, the coupling of the lever for lock 7 and the operation lever 5 is performed in the permitting state. However, the coupling is not limited to this and may be performed in the prohibiting state.

The lever for lock 7 and the operation lever 5 preferably have different colors. Consequently, when one of the lever for lock 7 and the operation lever 5 is operated, it is possible to surely operate the lever desired to be operated, that is, surely prevent an operation mistake.

The fixing section 18 temporarily fixes, that is, provisionally fixes the lever for lock 7 in the prohibiting state. As shown in FIGS. 15 to 17, the fixing section 18 includes an engaging piece 8 and a compression coil spring 9. The fixing section 18 is set in a recess 223 provided adjacent to the recess 221 of the base 2.

The engaging piece 8 is configured by a small piece. A corner section 81 of the engaging piece 8 project to the recess 221 in which the lever for lock 7 is arranged. As shown in FIG. 15, the corner section 81 can engage with a cutout section 73 formed in the lever for lock 7. Consequently, it is possible to fix the lever for lock 7 in the prohibiting state.

The compression coil spring 9 is a member configured to urge the lever for lock 7 in a direction in which the engaging piece 8 engages with the lever for lock 7. Consequently, the engaging piece 8 engages with the lever for lock 7. It is possible to maintain the fixing to the lever for lock 7. Therefore, it is possible to prevent the lever for lock 7 from inadvertently changing to the permitting state to allow the operation lever 5 to operate. Therefore, safety is high.

Materials forming the members included in the lever for lock 7 and the fixing section 18 are not particularly limited. For example, various metal materials such as stainless steel can be used.

The proximity sensor 17 is a detecting section configured to detect in a non-contact manner that the lever for lock 7 is in the prohibiting state. As the proximity sensor 17, it is preferable to use an optical sensor in which light emitted by a light emitting element (not shown in the figures) is received by a light receiving element (not shown in the figures). It is possible to detect according to a degree of the light reception of the light receiving element, that is, presence or absence of light reception whether the lever for lock 7 is present, that is, whether the lever for lock 7 is in the prohibiting state.

As shown in FIG. 18, the proximity sensor 17 is formed in a small piece shape and set in a recess 222 formed by further recessing the bottom of the recess 221 of the base 2. The proximity sensor 17 contributes to a reduction in the thickness (a reduction in the size) of the attaching and detaching device 1. The proximity sensor 17 can be opposed to the lever for lock 7 in the prohibiting state. In this state, as explained above, it is possible to detect the lever for lock 7.

The operation of the lock mechanism 16 having the configuration explained above (from the prohibiting state to the permitting state) is explained. The attaching and detaching device 1 is in the attached state in which the end effector 20 is attached in advance.

First, in the prohibiting state shown in FIG. 15, the cam follower 54 is located in the first portion 721 of the cam groove 72. At this point, the lever for lock 7 is fixed to the base 2 by the fixing section 18. Consequently, even if a force is applied to the operation lever 5 to operate the operation lever 5, since the cam follower 54 of the operation lever 5 is regulated from further moving in the first portion 721, the operation of the operation lever 5 is surely prohibited (see FIGS. 15 and 19).

Subsequently, as shown in FIG. 16, when the lever for lock 7 is pulled toward the right side in the figure, the cam follower 54 passes the first portion 721 to the second portion 722 of the cam groove 72 and reaches the third portion 723. Consequently, the lever for lock 7 changes to the permitting state.

Thereafter, the releasing mechanism 12 can be actuated as explained above (see FIG. 17). Therefore, it is possible to change the attaching and detaching device 1 in the detachable state in which the end effector 20 is detachable from the attaching and detaching device 1.

In the attaching and detaching device 1, in the attached state in which the end effector 20 is attached, the operation of the releasing mechanism 12 can be completely prohibited by the lock mechanism. 16 in which the lever for lock 7 is in the prohibiting state. Consequently, it is possible to surely prevent the end effector 20 from being inadvertently easily detached from the arm 102. When it is desired to actuate the releasing mechanism 12 and, for example, replace the end effector 20 with another end effector 20, it is possible to actuate the releasing mechanism 12 by changing the lever for lock 7 to the permitting state at desired timing.

The operations of the mechanisms until attachment of the other end effector 20 are explained with reference to flowcharts of FIGS. 23 and 24.

Flowchart of FIG. 23

In a state in which the attaching and detaching device 1 is not in the attached state yet, in the releasing mechanism 12, the engaging members 3 are in the engaging position. In the lock mechanism 16, the lever for lock 7 is in the prohibiting state. An attaching operation is started from such a state.

First, the control device 104 actuates the lock mechanism 16 to change the lever for lock 7 to the permitting state. Subsequently, the control device 104 actuates the releasing mechanism 12 to move the engaging member 3 to the disengaging position.

The control device 104 actuates a timer incorporated therein (step S1), stays on standby until time up (step S2), and thereafter determines whether the proximity sensor 17 is OFF, that is, whether the lever for lock 7 is not detected (step S3).

When it is determined in step S3 that the proximity sensor 17 is OFF, the control device 104 pushes the attaching and detaching device 1 into the end effector 20 from the proximal end side (step S4) and actuates the timer (step S5). The control device 104 stays on standby until time when the push-in is regarded as completed, that is, until time-up (step S6). When it is determined in step S3 that the proximity sensor 17 is not OFF, the control device 104 pulls out the lever for lock 7 to change the lever for lock 7 to the permitting state (step S7).

Subsequently, the control device 104 determines whether the operation lever 5 of the releasing mechanism 12 is operated and the engaging members 3 are present in the engaging position (step S8).

When it is determined in step S8 that the operation lever 5 is operated, the control device 104 presses the lever for lock 7 to change the lever for lock 7 to the prohibiting state (step S9). When it is determined in step S8 that the operation lever 5 is not operated, the control device 104 operates the operation lever 5 (step S10) to set the engaging member 3 in the engaging position and presses the lever for lock 7 to change the lever for lock 7 to the prohibiting state (step S9).

Subsequently, the control device 104 determines whether the proximity sensor 17 is ON, that is, whether the lever for lock 7 is detected (step S11).

When it is determined in step S11 that the proximity sensor 17 is ON, the attaching operation is completed. When it is not determined in step S11 that the proximity sensor 17 is ON, the control device 104 returns to step S9 and executes the subsequent steps.

Flowchart of FIG. 24

In a state in which the attaching and detaching device 1 is not in the attached state yet, in the releasing mechanism 12, the engaging members 3 are in the engaging position. In the lock mechanism 16, the lever for lock 7 is in the prohibiting state. An attaching operation is started from such a state.

First, the control device 104 actuates the lock mechanism 16 to change the lever for lock 7 to the permitting state.

The control device 104 actuates the timer incorporated therein (step S21) and stays on standby until time-up (step S22). Thereafter, the control device 104 determines whether the proximity sensor 17 is OFF, that is, whether the lever for lock 7 is detected (step S23).

When it is determined in step S3 that the proximity sensor 17 is OFF, the control device 104 pushes the attaching and detaching device 1 into the end effector 20 from the proximal end side (step S24) and actuates the timer (step S25). The control device 104 stays on standby until time when it is regarded that the push-in is completed, that is, until time-up (step S26). When it is determined in step S23 that the proximity sensor 17 is not OFF, the control device 104 pulls the lever for lock 7 and changes the lever for lock 7 to the permitting state (step S27).

In the push-in process in step S24, the projecting sections 203 of the end effector 20 are inserted into the through-holes 24 of the base 2. Consequently, the engaging members 3 come into contact with the taper sections 203c of the projecting sections 203 and slide on the taper sections 203c. At this point, the engaging members 3 move toward the disengaging position resisting the urging force of the compression coil springs 4. Thereafter, when the engaging members 3 climb over the taper sections 203c, the engaging members 3 are located in the engaging position again by the urging force of the compression coil springs 4. The operation lever 5 is displaced according to the movement of the engaging members 3.

After step S26, the control device 104 presses the lever for lock 7 to change the lever for lock 7 to the prohibiting state (step S28).

Subsequently, the control device 104 determines whether the proximity sensor 17 is ON, that is, the lever for lock 7 is detected (step S29).

When it is determined in step S29 that the proximity sensor 17 is ON, the attaching operation is completed. When it is not determined in step S29 that the proximity sensor 17 is ON, the control device 104 returns to step S28 and executes the subsequent steps.

When the operation based on the flowchart of FIG. 24 is performed in this way, it is possible to perform the attaching operation for the attaching and detaching device 1 with simple operation of pushing the attaching and detaching device 1 toward the end effector 20.

In the embodiment explained above, in the attaching and detaching device, the cam groove is provided in the lever for lock of the lever for lock and the operation lever. The cam follower is provided in the operation lever. However, the attaching and detaching device is not limited to this. The cam groove may be provided in the operation lever and the cam follower may be provided in the lever for lock.

The entire disclosure of Japanese Patent Application Nos. 2013-119569, filed Jun. 6, 2013 and 2013-120504, filed Jun. 7, 2013 are expressly incorporated by reference herein.

What is claimed is:

1. An attaching and detaching device which is provided between an arm and an end effector of a robot so that the arm and the end effector are detachable from the attaching and detaching device, the attaching and detaching device comprising:
 a base plate that is fixable to the arm and that is quadrangle-shaped, the base plate having first, second, and third sides at a periphery of the base plate, the first and second sides being directly adjacent to and perpendicular to each other in a plan view, the first side of the base plate having a cutout in the plan view, the third side of the base olate being located on an opposite side of the base plate from the second side;

a pair of engaging members including a first engaging member and a second engaging member, the pair of engaging members being supported by the base plate, the first and second engaging members being provided directly adjacent to the second and third sides of the base plate, respectively, each of the first and second engaging members being movable along a surface direction of the base plate and being configured to be engageable with a respective projection of the end effector;

a pair of urging members including first and second urging members, the pair of urging members being supported by the base plate, the first urging member being provided directly adjacent to the second side of the base plate and being located next to the first engaging member, the second urging member being provided directly adjacent to the third side of the base plate and being located next to the second engaging member, the urging members being configured to urge the engaging members toward an engaging direction in which the engaging members are engageable with the projections of the end effector in an engaging position; and a releasing mechanism that is supported by the base plate, the releasing mechanism including an operation lever configured to move the engaging members in a disengaging direction opposite to the engaging direction so that the engaging members are in a disengaging position where the arm is disengageable with the end effector, the releasing mechanism further including a link mechanism having a linkage bar pivotally mounted on the base plate, the linkage bar having a first end and an opposing second end, the first end being coupled to the first engaging member, the second end being coupled to the second engaging member, wherein the operation lever is configured to control pivotal movement of the linkage bar to thereby control movement of the engaging members in either the engaging direction or the disengaging direction; and wherein when the engaging members are in the engaging position, the operation lever is located in the cutout in the plan view so that the operation lever is completely located in an inner side of a contour of the arm in the plan view.

2. The attaching and detaching device according to claim 1, wherein each of the engaging members includes an engaging surface that inclines with respect to the surface direction of the base plate and is engageable with the respective projection of the end effector.

3. The attaching and detaching device according to claim 1, wherein the base plate includes two or more insert-through holes through which each projection is insertable.

4. The attaching and detaching device according to claim 1, wherein the base plate defines first and second grooves,
the first engaging member and the first urging member are disposed within the first groove, and the second engaging member and the second urging member are disposed within the second groove, and
the grooves are configured to guide movement of the engaging members in either the engaging direction or the disengaging direction.

5. The attaching and detaching device according to claim 4, wherein the urging members each include a compression coil spring inserted into the respective groove together with the respective engaging member.

6. The attaching and detaching device according to claim 1, wherein a toggle mechanism is configured by the operation lever and the link mechanism.

7. The attaching and detaching device according to claim 1, wherein the operation lever is arranged on a first surface of the base plate, and the link mechanism is arranged on a second surface, which is opposite to the first surface, of the base plate.

8. The attaching and detaching device according to claim 1, wherein the operation lever moves each engaging member resisting an urging force of each urging member.

9. A robot comprising:
an arm;
an end effector; and
an attaching and detaching device that is provided between the arm and the end effector, the attaching and detaching device being configured to selectively attach and detach the end effector to and from the arm, the attaching and detaching device including:

a base plate that is fixable to the arm and that is quadrangle-shaped, the base plate having first, second, and third sides at a periphery of the base plate, the first and second sides being directly adjacent to and perpendicular to each other in a plan view, the first side of the base plate having a cutout in the plan view, the third side of the base plate being located on an opposite side of the base plate from the second side;

a pair of engaging members including a first engaging member and a second engaging member, the pair of engaging members being supported by the base plate, the first and second engaging members being provided directly adjacent to the second and third sides of the base plate, respectively, each of the first and second engaging members being movable along a surface direction of the base plate and being configured to be engageable with a respective projection of the end effector;

a pair of urging members including first and second urging members, the pair of urging members being supported by the base plate, the first urging member being provided directly adjacent to the second side of the base plate and being located next to the first engaging member, the second urging member being provided directly adjacent to the third side of the base plate and being located next to the second engaging member, the urging members being configured to urge the engaging members toward an engaging direction in which the engaging members are engageable with the projections of the end effector in an engaging position; and a releasing mechanism that is supported by the base plate, the releasing mechanism including an operation lever configured to move the engaging members in a disengaging direction opposite to the engaging direction so that the engaging members are in a disengaging position where the arm is disengageable with the end effector, the releasing mechanism further including a link mechanism having a linkage bar pivotally mounted on the base plate, the linkage bar having a first end and an opposing second end, the first end being coupled to the first engaging member, the second end being coupled to the second engaging member, wherein the operation lever is configured to control pivotal movement of the linkage bar to thereby control movement of the engaging members in either the engaging direction or the disengaging direction, and wherein when the engaging members are in the engaging position, the operation lever is located in the cutout in the plan view so that the operation lever is completely located in an inner side of a contour of the arm in the plan view.

10. The robot according to claim 9, wherein each of the engaging members includes an engaging surface that inclines with respect to the surface direction of the base plate and is engageable with the respective projection of the end effector.

11. The robot according to claim 9, wherein the base plate includes two or more insert-through holes through which each projection is insertable.

12. The robot according to claim 9, wherein the base plate defines first and second grooves, the first engaging member and the first urging member are disposed within the first groove, and the second engaging member and the second urging member are disposed within the second groove, and the grooves are configured to guide movement of the engaging members in either the engaging direction or the disengaging direction.

13. The robot according to claim 12, wherein the urging members each include a compression coil spring inserted into the respective groove together with the respective engaging member.

14. The robot according to claim 9, wherein a toggle mechanism is configured by the operation lever and the link mechanism.

15. The robot according to claim 9, wherein the operation lever is arranged on a first surface of the base plate, and the link mechanism is arranged on a second surface, which is opposite to the first surface, of the base plate.

16. The robot according to claim 9, wherein the operation lever moves each engaging member resisting an urging force of each urging member.

* * * * *